US008804163B2

(12) United States Patent
Kimura

(10) Patent No.: US 8,804,163 B2
(45) Date of Patent: Aug. 12, 2014

(54) INFORMATION PROCESSING APPARATUS, PRINT CONTROLLING METHOD, PROGRAM, AND COMPUTER-READABLE STORAGE MEDIUM

(75) Inventor: Mitsuo Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 952 days.

(21) Appl. No.: 11/749,036

(22) Filed: May 15, 2007

(65) Prior Publication Data

US 2007/0273923 A1 Nov. 29, 2007

(30) Foreign Application Priority Data

May 29, 2006 (JP) ................................ 2006-148243

(51) Int. Cl.
*G06F 3/12* (2006.01)
(52) U.S. Cl.
USPC ........................................ 358/1.15; 358/1.1
(58) Field of Classification Search
None
See application file for complete search history.

(56) References Cited

U.S. PATENT DOCUMENTS

| 5,689,626 | A  | * | 11/1997 | Conley | 358/1.18 |
|---|---|---|---|---|---|
| 6,349,304 | B1 | * | 2/2002 | Boldt et al. | 1/1 |
| 6,474,881 | B1 | * | 11/2002 | Wanda | 400/61 |
| 6,628,417 | B1 | * | 9/2003 | Naito et al. | 358/1.15 |
| 6,906,813 | B1 | * | 6/2005 | Tuchitoi et al. | 358/1.14 |
| 6,916,127 | B2 | * | 7/2005 | Wanda | 400/61 |
| 7,016,060 | B1 |   | 3/2006 | Carney |   |
| 7,052,190 | B2 |   | 5/2006 | Ishii |   |
| 7,167,260 | B2 | * | 1/2007 | Iwata et al. | 358/1.15 |
| 7,271,928 | B2 | * | 9/2007 | Naito et al. | 358/1.15 |
| 7,719,703 | B2 | * | 5/2010 | Kurotsu et al. | 358/1.14 |
| 7,773,248 | B2 | * | 8/2010 | Kadota | 358/1.16 |
| 2002/0089691 | A1 |   | 7/2002 | Fertlitsch et al. |   |
| 2002/0163666 | A1 | * | 11/2002 | Iwata et al. | 358/1.15 |
| 2004/0156074 | A1 | * | 8/2004 | Kim | 358/1.15 |
| 2004/0160613 | A1 | * | 8/2004 | Kurotsu et al. | 358/1.1 |
| 2004/0190052 | A1 | * | 9/2004 | Sando | 358/1.15 |
| 2005/0088684 | A1 | * | 4/2005 | Naito et al. | 358/1.15 |
| 2005/0128513 | A1 | * | 6/2005 | Cho | 358/1.15 |
| 2007/0273923 | A1 | * | 11/2007 | Kimura | 358/1.15 |

FOREIGN PATENT DOCUMENTS

| CN | 1305144 A | 7/2001 |
|---|---|---|
| CN | 1619479 A | 5/2005 |
| EP | 1367482 | 12/2003 |
| JP | 11-161445 A | 6/1999 |
| JP | 2001-117737 A | 4/2001 |
| JP | 2001-290630 A | 10/2001 |
| JP | 2002-169680 A | 6/2002 |
| JP | 2004-054909 A | 2/2004 |

* cited by examiner

*Primary Examiner* — Marcus T Riley
(74) *Attorney, Agent, or Firm* — Canon USA, Inc., I.P. Division

(57) ABSTRACT

For example, when a large number of printer objects is registered in a Windows® system, a large amount of resources is consumed. Thus, a single computer is not sufficient, so that a plurality of computers is used. This results in an increased cost. With an output port of a first printer object that is set to a spooler of an operating system, a plurality of second printer objects is associated. Specification of one of the second printer objects is associated with a print request to the first printer object, so that print-job data is output to a printer at an output destination associated with the specified second printer object.

12 Claims, 17 Drawing Sheets

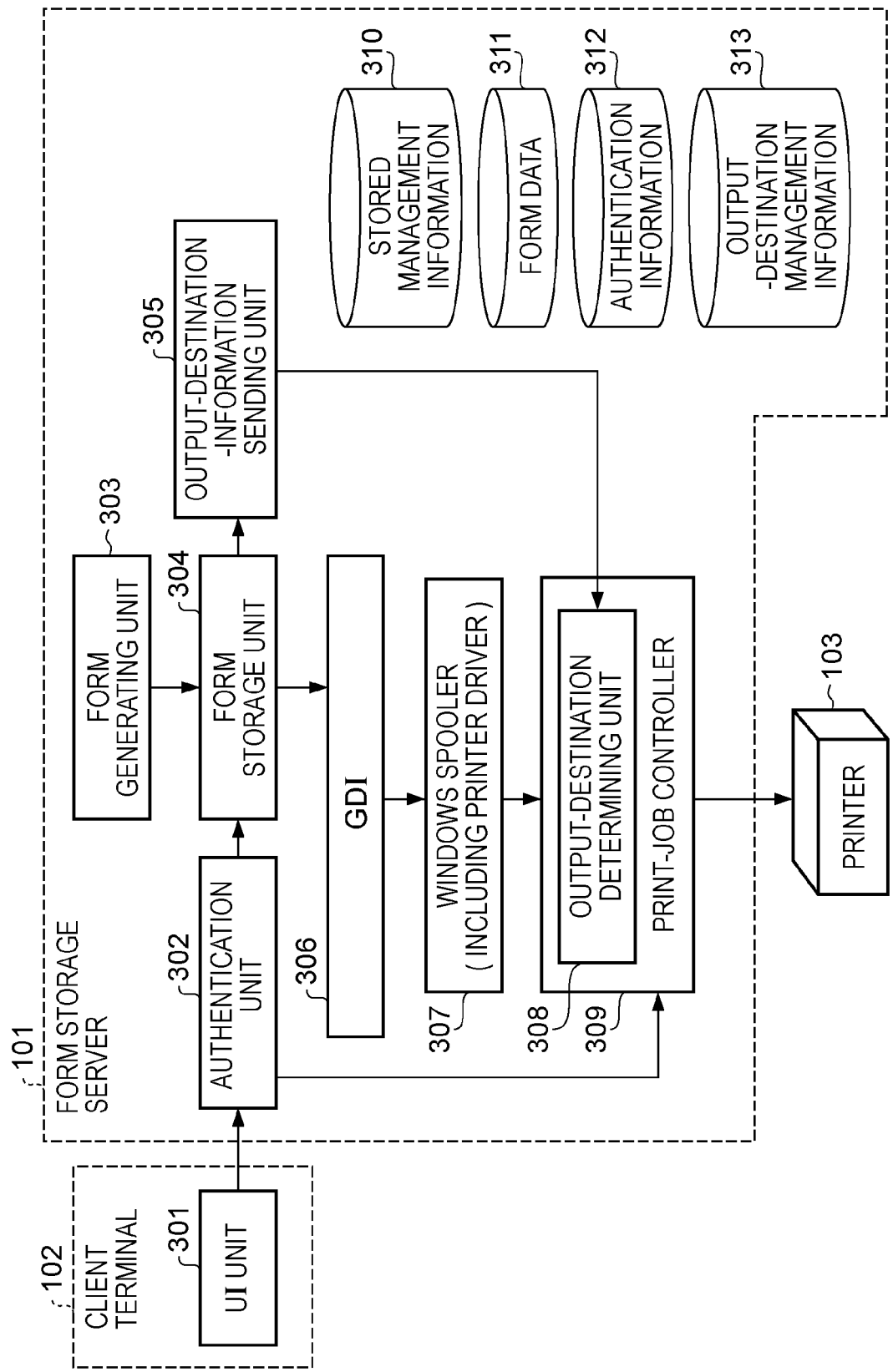

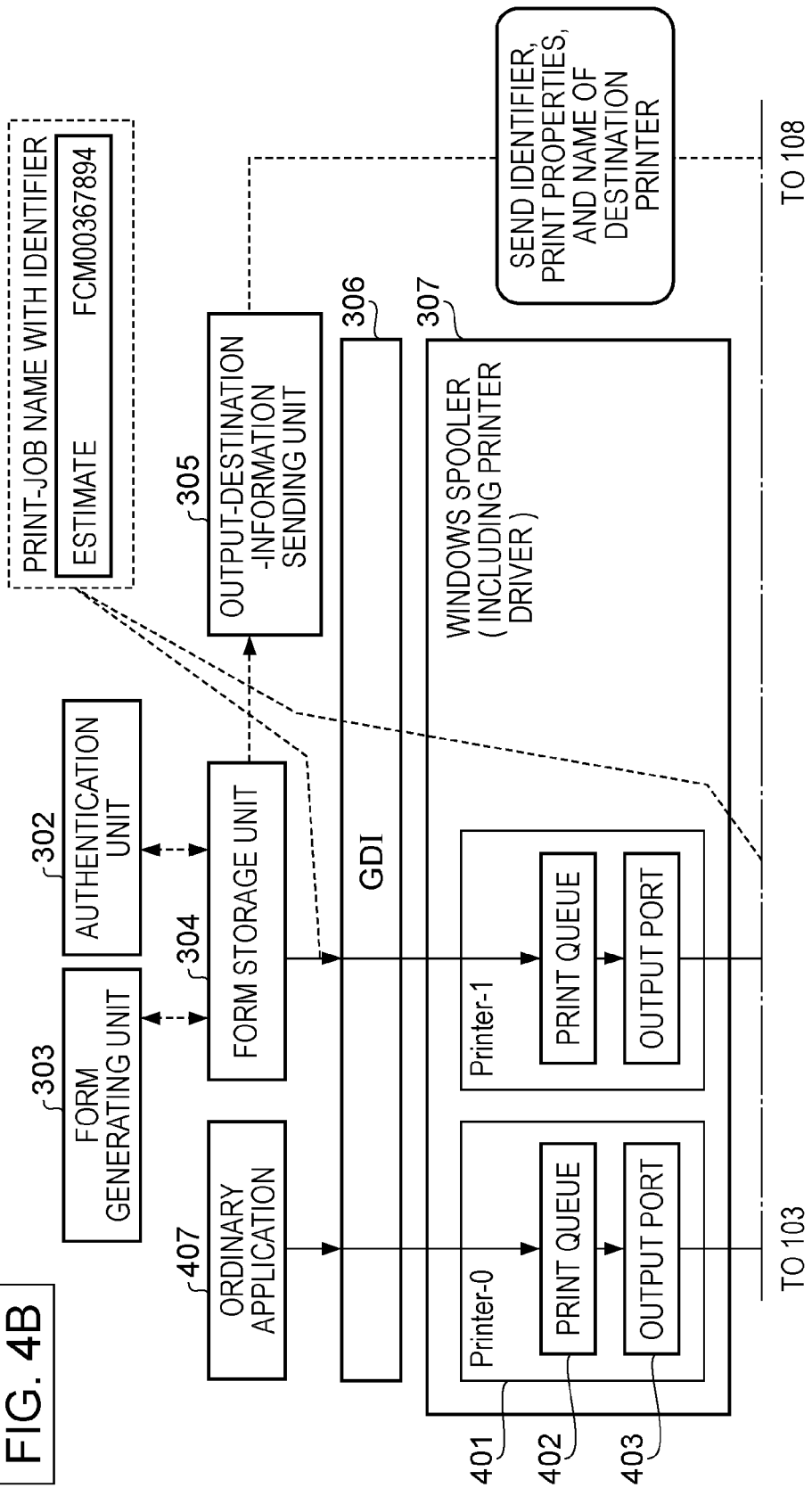

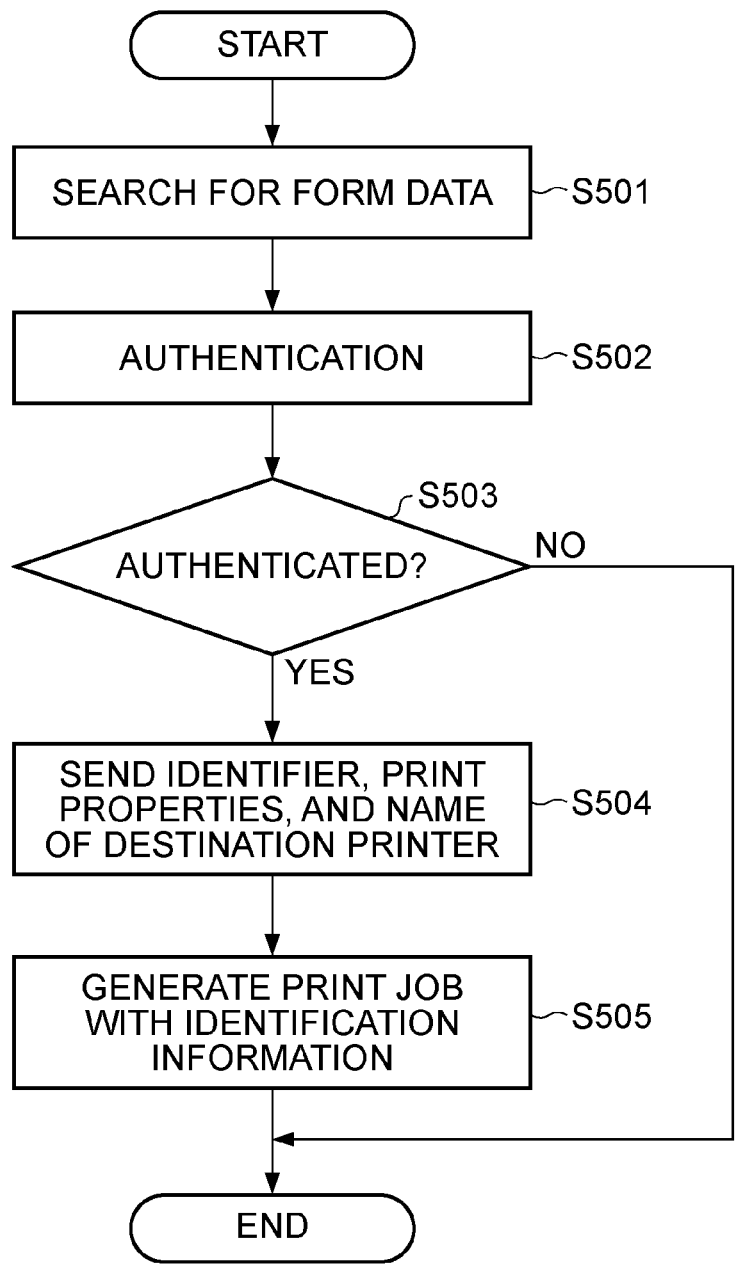

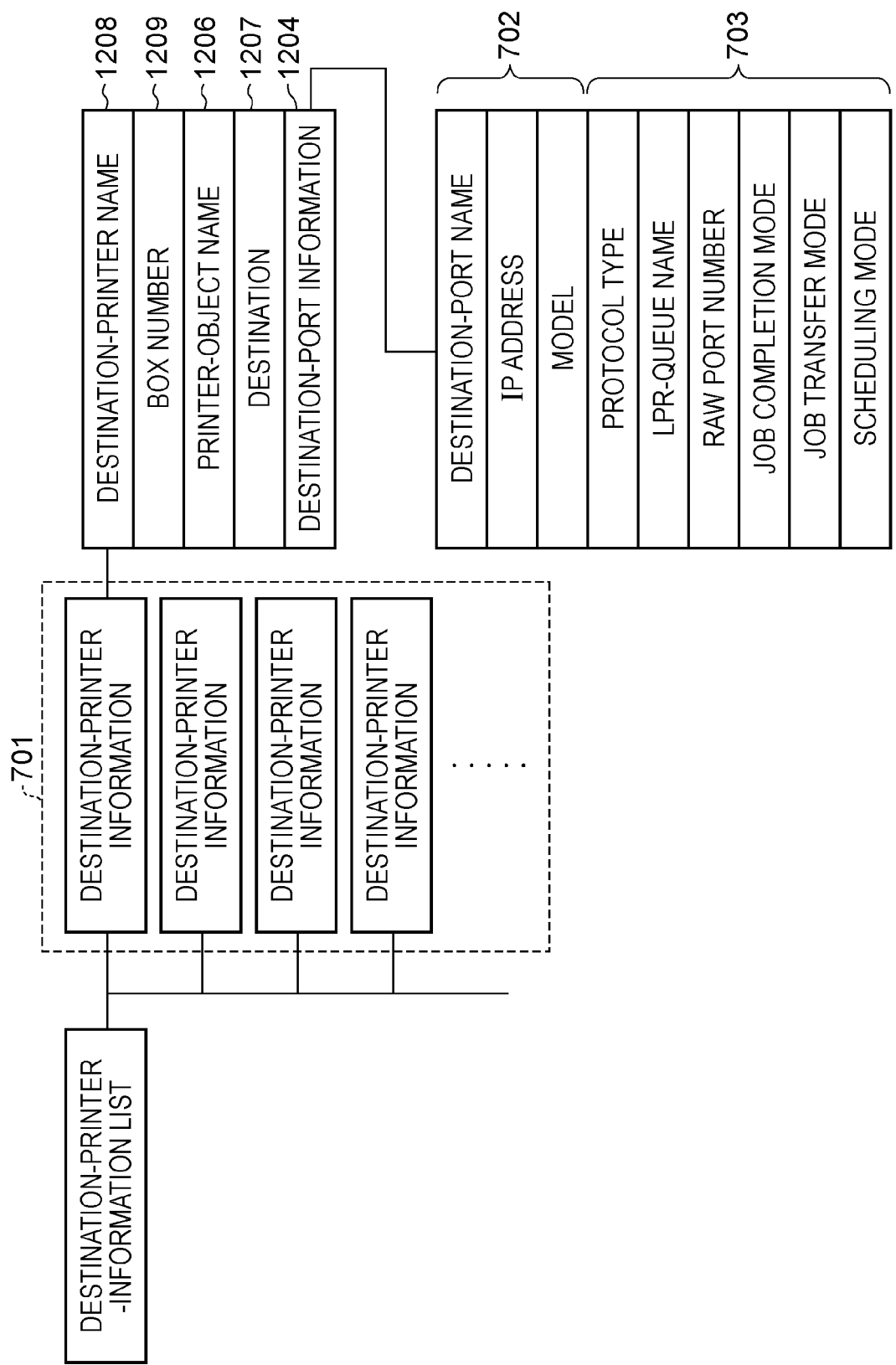

INFORMATION PROCESSING APPARATUS, PRINT CONTROLLING METHOD, PROGRAM, AND COMPUTER-READABLE STORAGE MEDIUM

BACKGROUND OF THE INVENTION

1. Field of the Invention

The present invention relates to printing systems in which a plurality of printers is caused to execute processing. For example, the present invention relates to a form printing system or the like.

2. Description of the Related Art

In a known type of printing system, an output form or the like that is created in advance is merged with data describing variable portions, and the resulting merged data is printed.

In the case of a large-scale form printing system or the like, printers at which form data is printed are located at sites (branch offices) throughout the country, and the number of printers is expected to be as large as several hundreds. In such a large-scale form printing system, it is difficult to manage all the printers by a single form storage server due to limitations of resources and performance of an operating system (hereinafter abbreviated as an OS). For example, in the case of Windows®, a printer object (logical printer) has to be created in order to register a printer as a print destination. Usually, in a print system of an OS, an environment in which several hundred printer objects are created is not anticipated, so that there is no guarantee that all the printer objects operate properly.

Thus, it has generally been the case to implement a system so that management of printers and print jobs is distributed to individual sites by providing print servers at individual sites, as described, for example, in Japanese Patent Laid-Open No. 2001-290630.

However, when print servers are provided at individual sites as in the form printing system described above, cost increases as the number of servers increases.

SUMMARY OF THE INVENTION

Embodiments of the present invention are provided to overcome the above-described drawbacks of the related technology.

According to an aspect of the present invention, there is provided an information processing apparatus with an operating system running thereon. The information processing apparatus includes a print-job controller configured to receive input of print data output from an output port of a first printer object that is set in a spooler of the operating system. The print-job controller includes a recognition unit configured to recognize a printer identifier in response to a print request, the printer identifier specifying one of a plurality of second printer objects managed by the print-job controller; a determining unit configured to determine an output destination of the print data output from the output port of the first printer object, on the basis of the printer identifier recognized by the recognition unit; and an output unit configured to output the print data to a printing device according to a setting of a second printer object determined by the determining unit. Thus, it is possible to implement a large-scale printing system in which a plurality of printers can be provided without increasing cost of servers.

Further features of the present invention will become apparent from the following description of exemplary embodiments with reference to the attached drawings.

BRIEF DESCRIPTION OF THE DRAWINGS

FIG. 3 is a functional block diagram of a client terminal and a form storage server in the printing system according to the embodiment.

FIGS. 4A and 4B are diagrams for explaining flows of print-job data in the embodiment.

FIG. 5 is a flowchart showing an example of processing that is executed when a print request to the form storage server is received from outside.

FIG. 7 is a diagram showing an example of data structure of output-destination management information managed by the print-job controller in the embodiment.

DESCRIPTION OF THE EMBODIMENTS

A preferred embodiment of the present invention will now be described in detail with reference to the drawings. In should be noted that the relative arrangement of the components, the numerical expressions and numerical values set forth in these embodiments do not limit the scope of the present invention unless it is specifically stated otherwise.

Overview of the System

Figure 1:
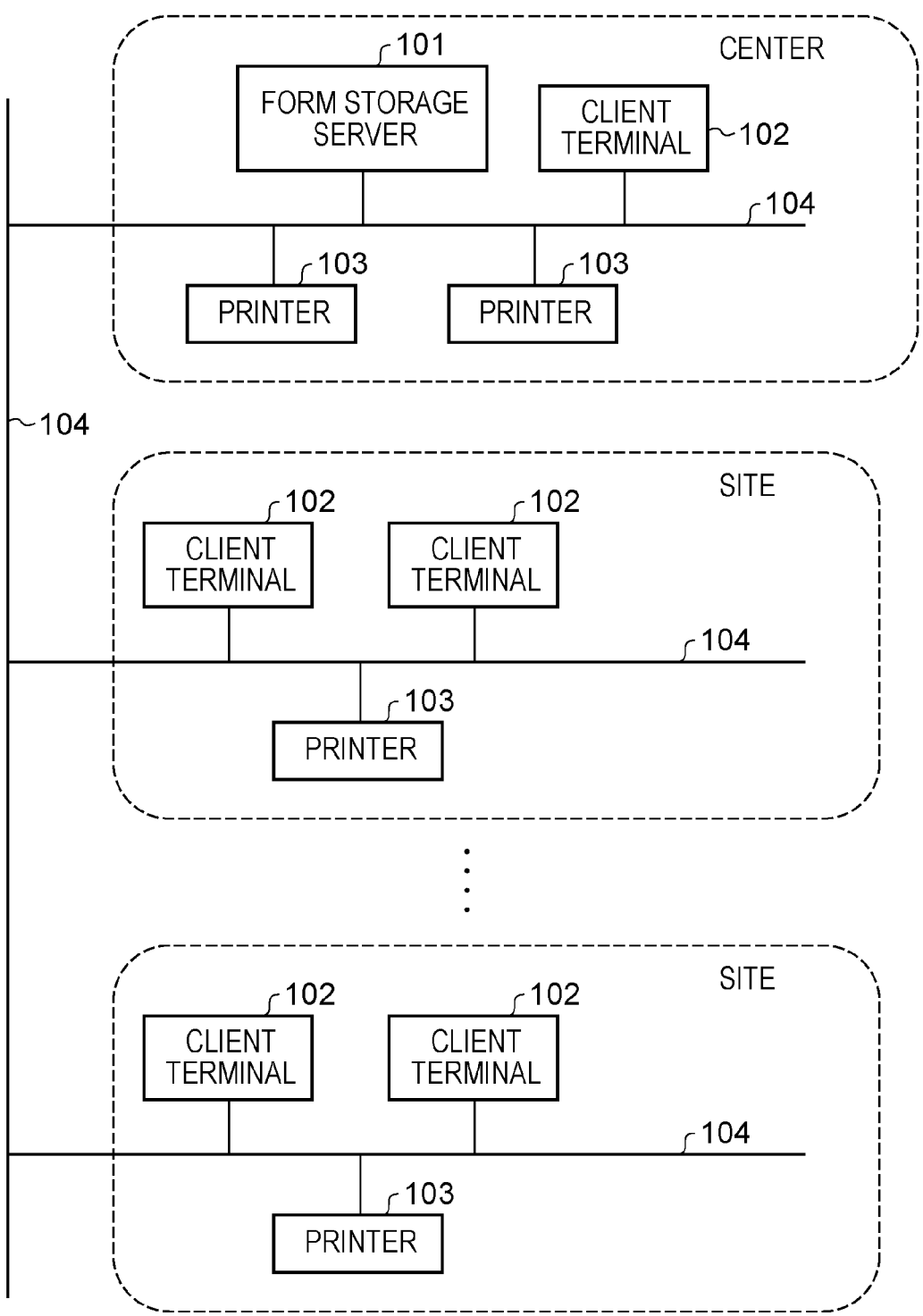
FIG. 1 is a block diagram showing the overall configuration of a printing system according to an embodiment of the present invention.

The following description will be given in the context of a form printing system as an example. FIG. 1 is a diagram showing the overall configuration of a form printing system according to an embodiment of the present invention.

Referring to FIG. 1, at a center, a form storage server 101, client terminals 102, and printers 103 are connected to each other via a communication circuit 104. Furthermore, at each site, client terminals 103 and a printer 103 are connected to each other via a communication circuit 104. Furthermore, the communication circuit 103 at the center and the communication circuits 104 at the sites are connected to each other. In FIG. 1, it is assumed that n sites exist in association with the center. Furthermore, the number of client terminals 102 and the number of printers 103 at the center and each of the sites can be individually determined arbitrarily. In this example, for convenience, only one client terminal and two printers are shown for the center and only two client terminals and one printer are shown for each site.

The communication circuits 104 are implemented, for example, by the Internet, local area networks (LANs), such as intranets, wide area networks (WANs), telephone circuits, leased digital circuits, ATM or frame relay circuits, communication satellite circuits, cable television circuits, or combination of these circuits. As long as data transmission and reception via the communication circuits 104 are allowed, communications between the client terminals 102 and the form storage servers 102, communications between the form storage servers 101 and the printers 103, and communications between the center and the sites may be carried out according to different protocols.

The client terminals 102 are, for example, desktop personal computers, notebook personal computers, mobile personal computers, or personal data assistants (PDAs). Alternatively, the client terminals 102 may be cellular phones having program functions, such as i-Mode® terminals.

The printers 103 are printers, such as laser printers, supporting network connection. Alternatively, the printers 103 may be ink-jet printers including ink-jet print engines, digital multifunction machines having multiple functions such as functions of a facsimile machine and a copying machine, or the like.

Figure 2:
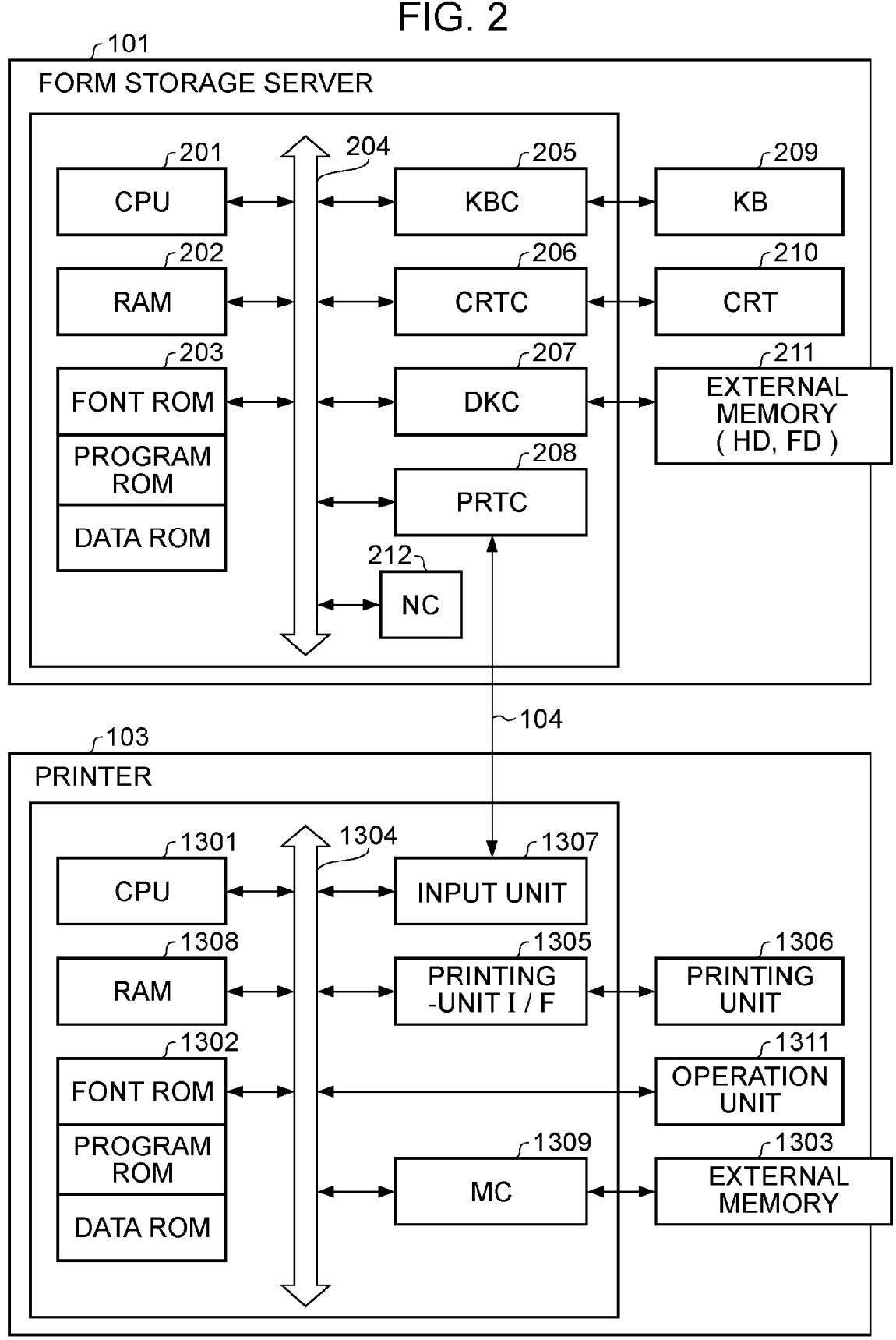
FIG. 2 is a block diagram showing basic hardware configurations of an information processing apparatus and a printing apparatus.

FIG. 2 is a block diagram showing basic hardware configurations of the form storage server 101 and the printer 101 shown in FIG. 1, showing connection between the form storage server 101 and the printer 103 in a simplified manner. It is assumed that the basic hardware configuration of the client terminal 102 can be represented by a block diagram corresponding to the block diagram of the form storage server 101. Furthermore, the hardware block diagram shown in FIG. 2 corresponds to a hardware block diagram of an ordinary information processing apparatus, so that the form storage servers 101 and the client terminals 102 in this embodiment can be implemented by computers having the hardware configuration of an ordinary information processing apparatus.

Hardware Block Diagram

First, the configuration of the form storage server 101 will be described. A central processing unit (CPU) 201 executes programs, such as an OS and applications, stored in a program ROM of a read-only memory (ROM) 203 or loaded from a hard disk 211 to a random access memory (RAM) 202. The OS is an abbreviation of an operating system that runs on a computer, and an operating system will hereinafter be referred to as an OS. The processing according to flowchart described later is achieved by execution of the programs. The RAM 202 functions as a main memory, a work area, and so forth for the CPU 201. A keyboard controller (KBC) 205 controls key inputs from a keyboard 209 or a pointing device (not shown). A CRT controller (CRTC) 206 controls display on a cathode-ray-tube (CRT) display 210. The CRT 210 display user interfaces, such as the one shown in FIG. 10 and described later, according to various display control instructions issued from the CPU 201 to the CRTC 206. A disk controller (DKC) 207 controls data access in a hard disk (HD) 211 or a floppy disk (FD) storing various types of data. A printer controller (PRTC) 208 controls exchange of signals with a printer 107 that is connected. A network controller (NC) 212 is connected to a network and controls communications with other devices connected to the network.

Next, the configuration of the printer 103 will be described. As shown in FIG. 2, a printer CPU 1301 controls blocks connected to a system bus 1304 according to control programs stored in a ROM 1302 or an external memory 1303. Image signals generated through processing executed by the CPU 1301 are output to a print unit (printer engine) 1306 via a print-unit interface (I/F) 1305 as output information. Furthermore, the CPU 1301 can communicate with the form storage server 101 via an input unit 1307, so that, for example, the CPU 1301 can send information in the printer 103 to the form storage server 101.

A program ROM in the ROM 1302 stores control programs for the CPU 1301 and the like. A font ROM in the ROM 1302 stores font data and the like that is used to generate output information. A data ROM in the ROM 1302 stores, for example, information used at the form storage server 101 in the case of a printer not including the external memory 1303 such as a hard disk.

A RAM 1308 functions as a main memory, a work area, and so forth for the CPU 1301. The memory capacity of the RAM 1308 can be extended by connecting an optional RAM to an extension port (not shown). Furthermore, the RAM 1308 is used to as an area for generating output information, an area for storing environment data, a non-volatile RAM area, and so forth. The external memory 1303, such as a hard disk (HD) or an IC card, is accessed under the control of a memory controller (MC) 1309. The external memory 1303 is connected optionally, and stores font data, emulation programs, form data, and so forth. An operation panel 1311 has operation switches, display elements implemented by light-emitting diodes (LEDs), and so forth.

Software Block Diagram

FIG. 3 is a diagram showing functional blocks of the client terminal 102 and the form storage server 101 shown in FIG. 1. Each of the functional blocks is implemented by execution of a program stored in a non-volatile memory 203 by the CPU 201 using the hardware configured as described with reference to FIG. 2. Furthermore, the functions may be executed in part or entirely by the OS running on the form storage server 101. The client terminal 102 includes a user interface (UI) unit 301 that displays a list of form data 311 stored in the form storage server 101 so that a user can select form data 311 and instruct the form storage server 101 to execute printing. The form data 311 includes a plurality of types of data. A typical example of actual data is form format data that has to be converted into data in a page description language parsable by the spooler 307. Another example of actual data is data that has been converted into a page description language format. Particularly, when data that is stored is in a page description language format, it is possible to change setting regarding specific print setting parameters on a setting screen show in FIG. 10 and described later. As described above, form data in various formats are stored so that instructions for repeated printing can be issued.

An authentication unit 302 of the form storage server 101 determines whether to accept a request from the client terminal 102 on the basis of authentication information 312 shown in FIG. 15 and described later.

A form-generating unit 303 generates the form data 311 on the basis of form template data, application data, or the like. A form storage unit 304 stores and manages the form data generated by the form-generating unit 303. An output-destination-information sending unit 305 outputs information specified via the UI unit 301 of the client terminal 102 to an output-destination determining unit 308 when the form data 311 stored in the form storage unit 304 is printed. Specifically, the output-destination-information sending unit 305 sets an identifier indicating that the associated print data has been issued by a specific source (the form-generating unit 303) at the end of the job name. More specifically, to the output-destination determining unit 308, the output-destination-information sending unit 305 reports print properties, a destination-printer name, and an identifier indicating printing of form data (e.g., a text string at the end of a document name). The identifier is generated by the form storage unit 304 when a print job is generated, and the form storage unit 304 attached the identifier to the print-job name so that the identifier is reported to the output-destination determining unit 308 via the output-destination-information sending unit 305. The destination-printer name refers to a printer identifier specifying one of a plurality of second printer objects managed by the print-job controller 309 according to a print request. Thus, without limitation to a name, the destination-printer name may be any type of information, for example, a number or binary data, as long as the information allows identification of a printer object of the destination printer.

The output-destination determining unit 308 receives print data converted by the spooler 307 of the OS, and determines an output destination on the basis of the destination-printer name received from the output-destination-information sending unit 305. The print data herein includes drawing data and various types of print setting data such as print layout data, and data used for print output is collectively referred to as "print data". Furthermore, print data can also be referred to as a print job or print-job data. The following description will be given using these terms.

The print-job controller 309 monitors the printer 103 corresponding to the destination printer via the communication circuit 104 to check whether the printer 103 is ready for printing. Then, the print data is sent to the destination printer (the printer 103) determined as an output destination by the output-destination determining unit 308 on the basis of the result of the checking. Then, the print data is held in preparation for printing on behalf or re-printing until it is confirmed that the print job sent to the printer 103 has been completed. The sending of print data to the printer 103 by the print-job controller 309, described above, actually refers to controlling a sending unit to carry out data communications, and this controlling operation will hereinafter referred to as output or sending when appropriate.

The output-destination determining unit 308 includes an output-destination-information manager 314 (refer to FIGS. 4A and 4B) that manages print properties, a destination-printer name, and an identifier received from the output-destination-information sending unit 305.

A graphic device interface (GDI) 306 is a programming interface that is provided the OS to allow an application program to generate a print job. The spooler 307 spools data that has been converted using a printer driver. In this embodiment, the spooler 307 is a Windows® spooler provided by the Windows® operating system.

Although the form storage server 101 includes the form-generating unit 303 in FIG. 3, the form-generating unit 303 may be provided in a separate case so that the form data 311 is sent to the form storage unit 304 via the communication circuit 104.

First Embodiment

Flow of Print Data

Figure 4B:
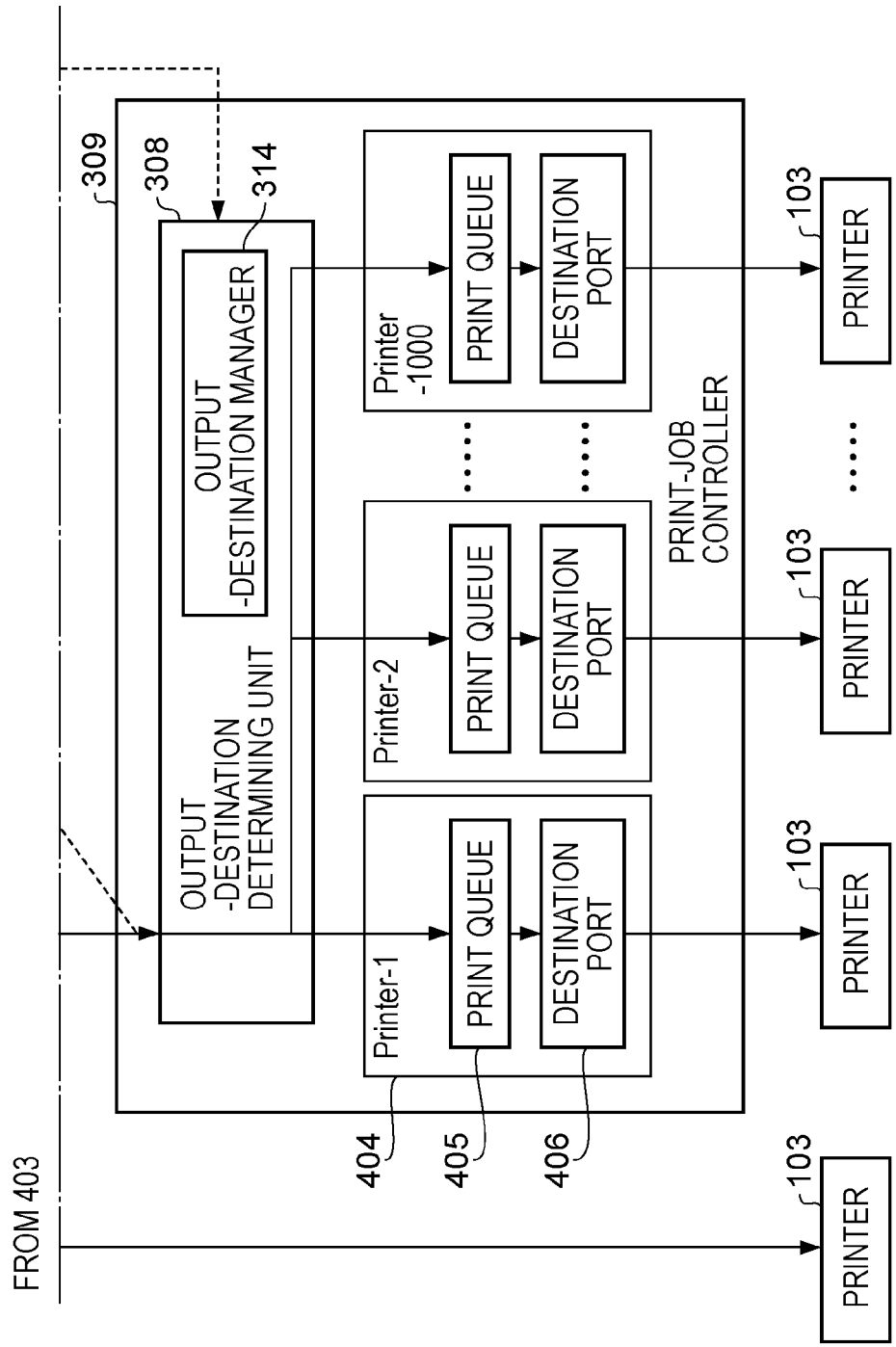

FIGS. 4A and 4B are diagrams showing flows of processing executed to print the form data 311 stored in the form storage server 101 shown in FIG. 3 by the printer 103.

First, a printer object 401 will be described. The printer object 401, shown on the spooler 307 provided by the OS, is managed by the spooler 307. The printer object 401 includes a print queue 402 and an output port 403, and holds information needed to convert drawing data received from an application via the GDI 306 into print data. The information needed to convert drawing data into print data includes information set via a printer-driver setting screen, for example, print-job setting such as 2-in-1 copying, double-sided print, or print resolution, or information regarding an output destination (image forming apparatus) of print data.

In this embodiment, the number of the printer objects 401 created on the spooler 307 does not coincide with the number of the printers 103, and the number of the printer objects 401 may be one depending on cases. The output port 403 functions as an interface for passing data to the output-destination determining unit 308. Although the output-destination determining unit 308 is included in the print-job controller 309 in FIGS. 4A and 4B, without limitation, as long as the output-destination determining unit 308 is allowed to exchange information with the print-job controller 309, the output-destination determining unit 308 may be provided separately from the print-job controller 309.

Next, a printer object 404 will be described. The printer object 404 (hereinafter referred to as a destination printer), shown on the print-job controller 309, is managed by the print-job controller 309. For the purpose of distinction from the printer object 401 described earlier, one can be referred to as a first printer object and the other can be referred to as a second printer object. Similarly to the printer object 401 of the spooler 307 described earlier, the destination printer 404 includes a print queue 405 and a destination port (corresponding to an output port) 406. It is to be noted that the number of the printer objects 404 coincides with the number of printers managed by the form system. For example, when 1,000 printers are managed by the print-job controller 309, 1,000 printer objects are created and managed on the print-job controller 309.

Next, the flows of the form data 311 stored in the form storage unit 304 will be described. The form data 311 stored in the form storage unit 304 is read in response to a request from the client terminal 102. When authentication by the authentication unit 302 succeeds, printing of the form data 311 is allowed. When a print request involving the form data 311 is received from the client terminal 102, the form storage unit 304 passes the destination-printer name specified via the UI unit 301 of the client terminal 102 to the output-destination-information sending unit 305, and the output-destination-information sending unit 305 passes (reports) the destination to the output-destination determining unit 308.

Furthermore, the form storage unit 304 passes the form data 311 to the spooler 307 via the GDI 306. At this time, a printer object 401 existing on the spooler 307 is specified. The spooler 307 (and the printer driver included in the spooler 307) converts the form data 311 into print data parsable by the printer 103, and stores the print data in the print queue 402 of the printer object 401.

Then, the print data stored in the print queue 402 is transferred to the output port 403 according to scheduling by the spooler 307, and the print data output from the output port 403 is input to the output-destination determining unit 308. The output-destination determining unit 308 searches for a destination printer 404 corresponding to the destination-printer name received in advance from the output-destination-information sending unit 305, and stores the print data in the print queue of the destination printer 404.

Functions of the Print-Job Controller 309

The print-job controller 309 is defined as an output destination of a printer object set to the spooler 307 running on the OS so that print-job data is input to the print-job controller 309. Furthermore, the print-job controller 309 has the following functions.

The print-job controller 309 monitors the status of the printer 103 connected to the destination port 406 and the status of the print job. When it is determined that the print data is ready for sending, the print-job controller 309 fetches the print data from the print queue 405 and sends the print data to the printer 103. The print data sent to the printer 103 is tracked by the print-job controller 309 until printing is completed.

More specifically, the print-job controller 309 holds input print data, and sends and outputs the print data to the external printer 103 when needed. For example, the print-job controller 309 issues a print reservation to the printer 103, receives a print-data transfer request from the printer 103 according to scheduling by the printer 103, and outputs the print data to the printer 103 in response to the transfer request. In addition, the print-job controller 309 holds print data input thereto so that the print data can be used, for example, to transfer an alternative job to another printer 103 when the printer 103 is in trouble.

On the other hand, print data output from the printer object 401, shown at the top left part of FIG. 4A, is input to the printer 103 without passing through the print-job controller 309. In this case, the print data sent outside via the output port is deleted upon completion of output without being held until completion of printing.

In the case shown in FIGS. 4A and 4B, a path extending from the output-destination-information sending unit 305 to the output-destination determining unit 308 is provided so that it is not needed to register a plurality of printer objects 401 to the Windows® spooler 307. Although it is possible to create a plurality of printer objects 401 on the Windows® spooler 307 when a plurality of printer objects is created on the print-job controller 309, in this embodiment, it is not necessary to register such a plurality of printer objects 401, so that it is possible to reduce resources needed for Windows® printer objects 401. Accordingly, it is possible to implement a large-scale printing system in which a plurality of printers can be set without increasing cost relating to servers.

Flowchart of Print-Job Generation

FIG. 5 is a flowchart showing a flow of processing in which the form storage server 101 generates a print job in response to a processing request received from the client terminal 102 and inputs the print job to the spooler 307. Steps S501, S503, and S505 in the flowchart are executed by the form storage unit 304, step S502 is executed by the authentication unit 302, and step S504 is executed by the output-destination-information sending unit 305.

First, upon receiving a print processing request involving form data from the UI unit 301 of the client terminal 102, in step S501, the form storage server 101 searches the stored management information 310 for the form data 311 relevant to the request. The request includes a user ID of the user issuing the request, and information identifying the form data 311. Furthermore, when the request is a print-execution request, the request additionally includes a destination-printer name, which is a printer identifier specifying one of the printer objects 404 shown in FIGS. 4A and 4B, and a Windows® printer-object name associated with the destination printer.

Figure 15:
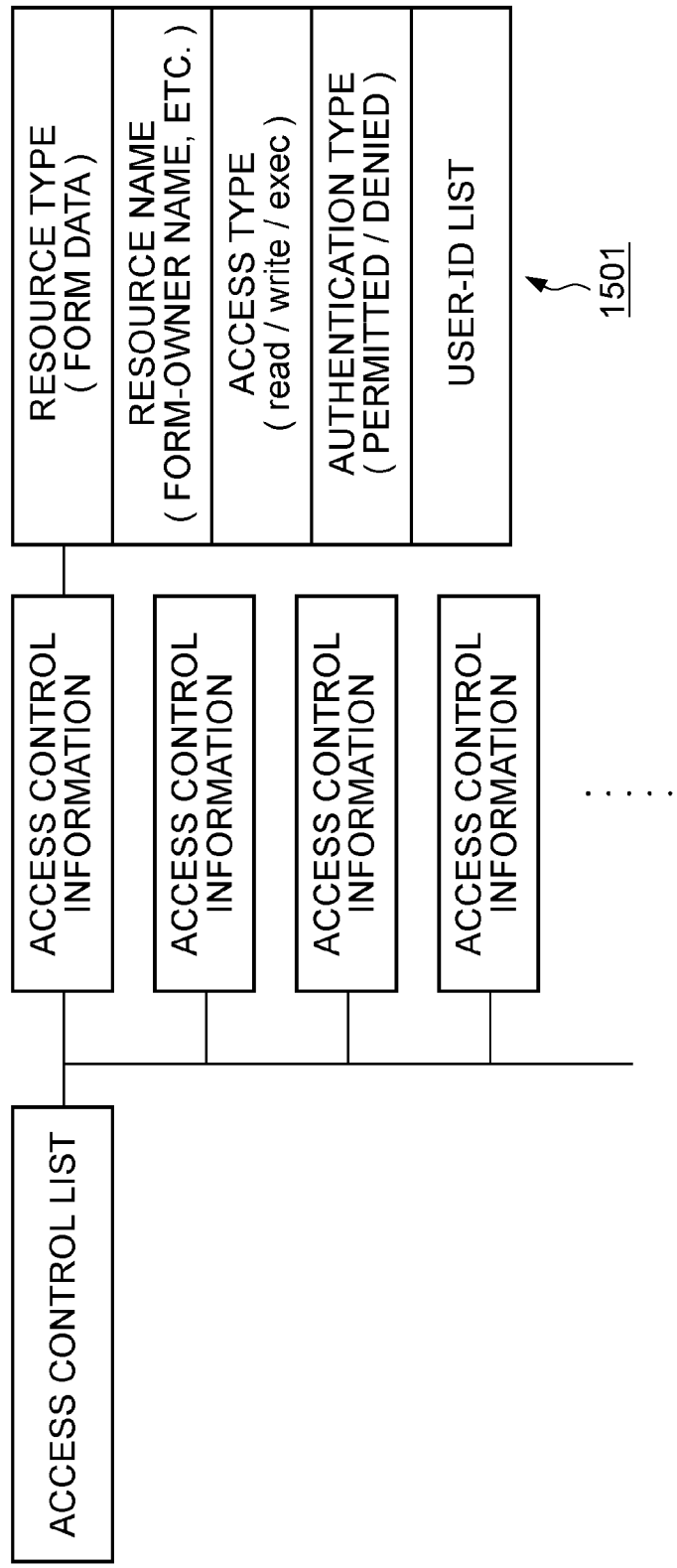
FIG. 15 is a diagram showing an example of the data structure of authentication information used in the embodiment.

In step S502, with reference to authentication information 312 (described later in detail with reference to FIG. 15), it is determined on the basis of the user ID and the destination-printer name included in the print request, the form data 311, and the resource information shown in FIG. 15 whether the destination printer has a privilege to execute printing of the form data 311 found by the searching in step S501. Specifically, the user ID included in the request received in step S501 is searched from the access control information (refer to FIG. 15) stored in the form of a database, and it is determined whether the processing specified by the request is allowed. More specifically, it is determined whether the user ID included in the request is included in the access control information of the specified form data (document identifier) and the access control information of the destination printer (printer identifier). Then, on the basis of the determination, it is determined whether to permit execution of the print request. When the user ID included in the request is included in both the access control information of the form data and the access control information of the destination printer, step S503 results in YES.

When it is determined that the destination printer does not have the privilege to print the form data, the process is exited. In this case, an error message indicating that the destination printer does not have the privilege to print the form data is displayed on the UI unit 301 of the client terminal 102 on the basis of a report from the form storage server 101.

On the other hand, when it is determined in step S503 that the destination printer has the privilege to print the form data, the process proceeds to step S504. In step S504, the identifier identifying printing of form data, and the print properties and the destination-printer name (printer identifier) specified via the UI unit 301 of the client terminal 102 are sent (reported) to the output-destination determining unit 308. This report is issued to the print-job controller 309 before the print data is input to the print-job controller 309. Furthermore, the identifier corresponds to information indicating whether a print job received by the output-destination determining unit 308 from the Windows® spooler 307 is a print job managed by the form storage unit 304.

In step S505, the identifier of the print job sent to the output-destination determining unit 308 in step S504 is attached (set) to the document name of the print job, and the form data is passed to the spooler 307 via the GDI 306, whereby a print job is generated.

Flowchart of Print-Job Output

Figure 6:
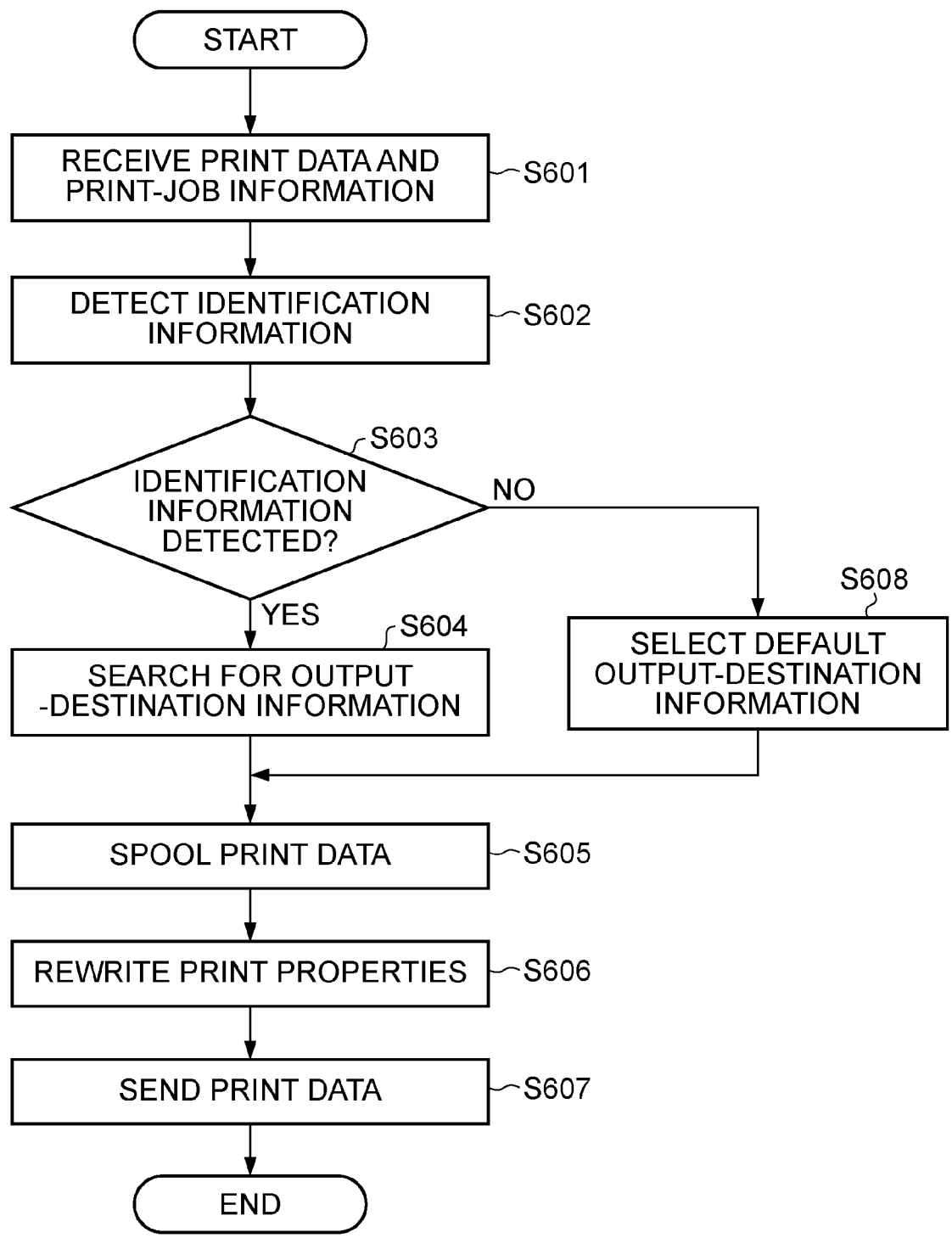
FIG. 6 is a flowchart showing an example of processing that is executed when print-job data is input to a print-job controller in the embodiment.

FIG. 6 is a flowchart showing the flow of a process in which the print data converted by the spooler 308 is sent to the printer 103 according to the print job generated by the flow shown in FIG. 5. In this flowchart, steps S601 to S604 are executed by the output-destination determining unit 308, and steps S605 to S608 are executed by the print-job controller 309.

In step S601, print-job data output from the output port 403 of a first printer object 401 set in the spooler 307 of the operating system is input. More specifically, print data and print-job information generated by the spooler 307 are received via the output port 403. The print-job information includes a print-job name and so forth.

In step S602, the output-destination determining unit 308 detects an identifier indicating printing of form data, attached to the print-job name.

In step S603, it is determined whether an identifier is attached. When it is determined in step S603 that an identifier is attached, in step S604, the output destination of the print data output from the output port 403 of the first printer object 401 is determined on the basis of the destination-printer name reported earlier. More specifically, the destination printer 404 corresponding to the destination-printer name received together with the identifier from the output-destination-information sending unit 305 in step S504 shown in FIG. 5 is searched for and determined as the output destination.

In step S605, the print data is spooled in the print queue 405.

In step S606, the print properties of the print data are rewritten according to the print properties received together with the identifier from the output-destination-information sending unit 305 in step S504 shown in FIG. 5. Then, in step S607, the print data is sent (output) to the printer 103 according to the setting of the destination port 406. Actually, the printer 103 to which the print data is set is determined according to the setting of the second printer object 404.

On the other hand, when a print job is input to the printer object 401 of the spooler 307 from an ordinary printing application, such as MS-Word®, instead of from the form storage unit 304, an identifier identifying the print job is not attached. Thus, in step S603 shown in FIG. 6, it is determined that an identifier is not attached.

When it is determined in step S603 that an identifier is not detected, in step S608, print data is output to a printing apparatus at an output destination corresponding to a second printer object having the same identifier (name) as the first printer object. More specifically, a default destination printer (in this embodiment, a destination printer having the same destination-printer name as the logic printer name of the printer object 401 on the spooler 307) is selected. The process then proceeds to step S605.

Manner of Management of Output-Destination Management Information

FIG. 7 shows a data structure of output-destination management information 313 managed by the print-job controller 309.

The output-destination management information 313 includes a destination-printer-information list 701. Each piece of destination-printer information included in the destination-printer-information list corresponds to a destination printer 404, and includes a destination-printer name, default print properties (including a box number or the like), and reference information for destination-port information.

The destination-port information is information associated with the destination port 406. The setting of the destination-port information is used when sending print data in step S607 as described earlier. The destination-port information includes a destination-port name, an IP address of the printer 103, a model, and so forth. Furthermore, the destination-port information includes a protocol type (LPR or RAW) for sending print data, and an LPR-queue name that is used when the protocol type is LPR or a port number that is used when the protocol type is RAW. Furthermore, the destination-port information includes information representing a job completion mode indicating whether a print job is to be completed upon completion of sending of print data or upon sheet ejection at the printer 103. Furthermore, the destination-port information includes information representing a job transfer mode indicating whether print data is to be transferred to the printer 103 while spooling or print data is to be transferred after completion of spooling. Furthermore, the destination-port information includes information representing a scheduling mode indicating whether sending of print data to the printer 103 is to be scheduled on the host side or on the printer side.

Manner of Display of the Status of the Spooler 307

Figure 8A:
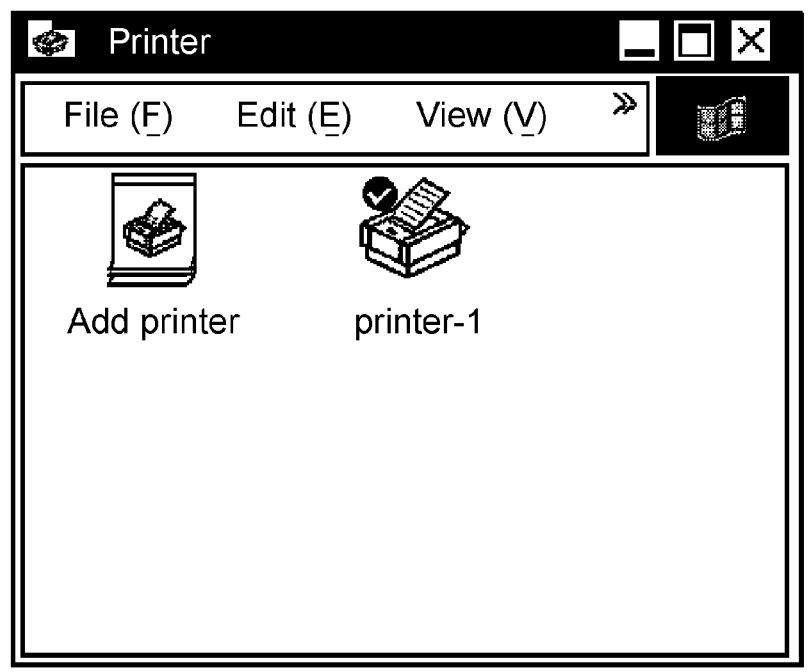
FIGS. 8A and 8B are illustrations showing example screens relating to a spooler of an operating system in the embodiment.

FIG. 8A is a diagram showing the status of the spooler 307 displayed by a spooler UI 801 provided by the OS. In FIG. 8A, an icon 802 represents a printer object 401 on the right side, registered in the Windows® spooler 307. Actually, since two printer objects 401 are registered, two icons are displayed in the screen shown in FIG. 8A. However, for simplicity of description, only one icon is shown in FIG. 8A. On the other hand, one icon (or two icons) representing the printer object 401 is shown. However, a plurality of destination printers (1,000 destination printers in FIGS. 4A and 4B) is registered in the print-job controller 309. The name of the icon 802 corresponds to a name that has been changed in step S1303 described later.

Figure 8B:
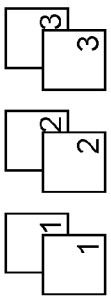

FIG. 8B shows a print dialog presented by an ordinary application when a print instruction is issued from ordinary document creating software such as MS-WORD or graphics creating software using Printer-1 shown in FIG. 8A. When a print instruction is issued via the print dialog shown in FIG. 8B, a print job for which step S603 shown in FIG. 6 results in NO is input to the printer object 401. On the other hand, a print dialog shown in FIG. 10 is associated with an application having the form-generating unit 303, and corresponds to a setting screen displayed on the display unit of the form storage server 101. When a print instruction is issued via this print dialog, the form storage unit 304 attaches an identifier indicating that the print job has been issued from the form-generating unit 303 as a print-job name.

Manner of Display of Destination-Printer List

Figure 9:
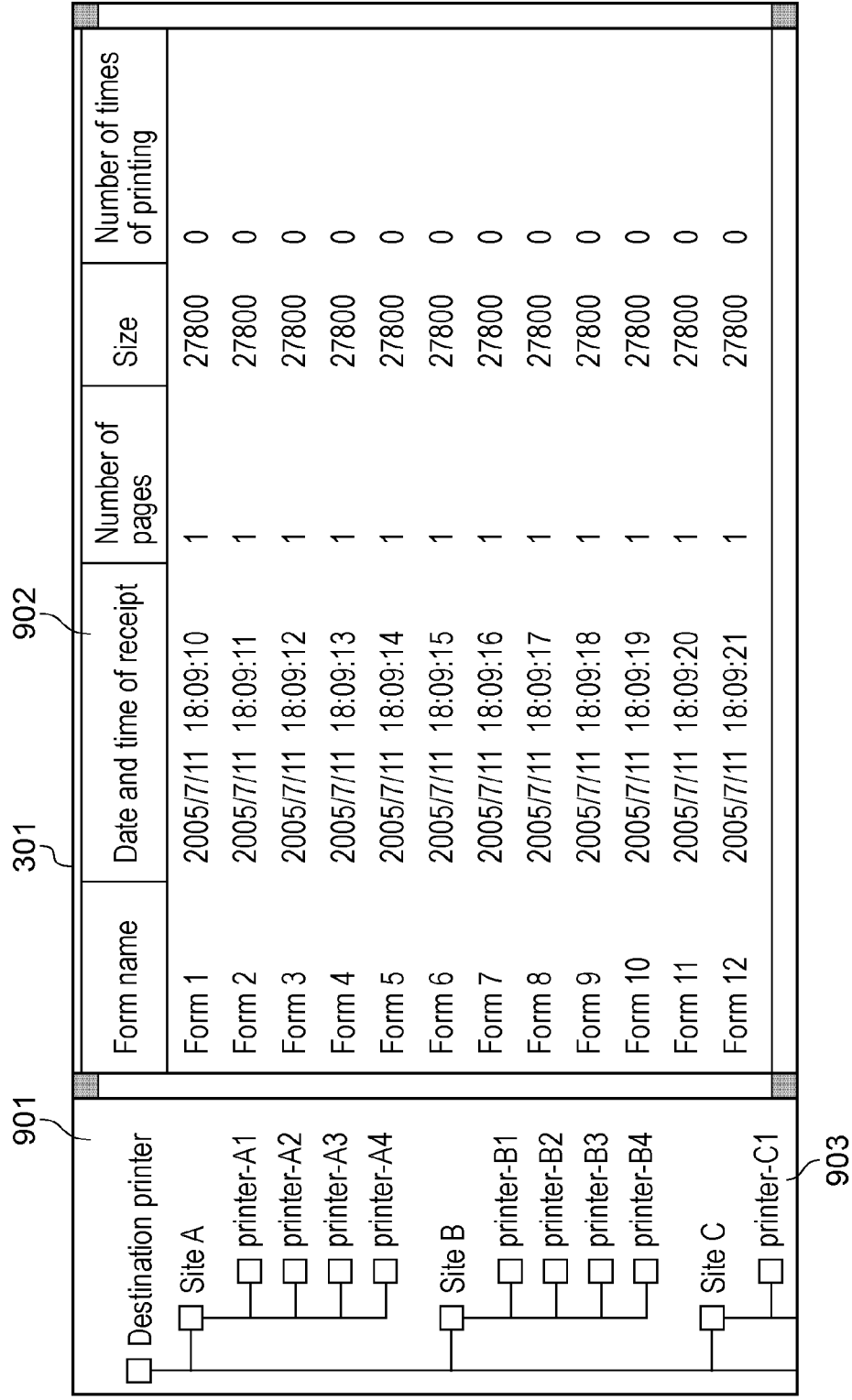
FIG. 9 is a diagram showing an example of a list of destination printers and a list of forms displayed on a user interface unit of a client terminal in the embodiment.

FIG. 9 is a diagram showing a list of destination printers and a list of forms, displayed on the UI unit 301 of the client terminal 102.

In a destination-printer-list display area 901, a list of destination-printer names 903 managed by the print-job controller 309 is displayed in the form of hierarchical trees for the individual sites. In FIG. 9, sites A, B, C, . . . correspond to destinations input via an input section 1207 in FIG. 12B described later. Furthermore, Printer-A1, Printer-A2, . . . in FIG. 9 correspond to destination-printer names set via an input section 1208 in FIG. 12B described later.

In this embodiment, it is assumed that the print-job controller 309 controls 1,000 destination printers, so that 1,000 printers are listed in the destination-printer-list display area 901.

In the form-list display area 902, a list of form data managed by the form storage unit 304 is displayed. In addition to a function of displaying a list of the form data 311 stored in the form storage server 101, the UI unit 301 has a function of sending a print request to the form storage server with specifications of form data 311, a destination printer, and print properties.

Setting Screen of Client Terminal

Figure 10A:
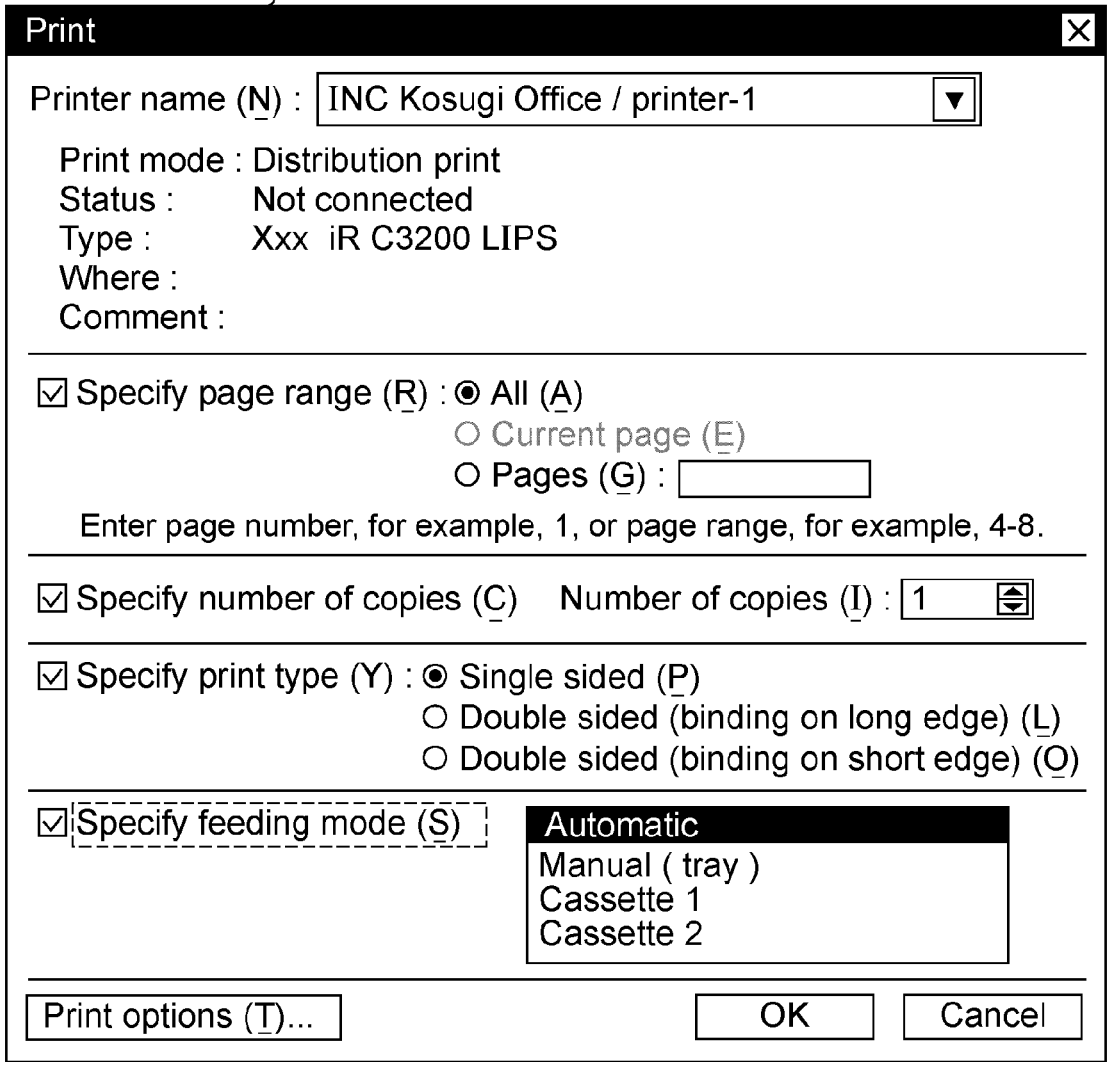
FIGS. 10A and 10B are illustrations showing an example of a print-property specifying screen and a print-option specifying screen that are displayed when a print request is sent from the user interface unit of the client terminal to the form storage server in this embodiment.
Figure 10B:
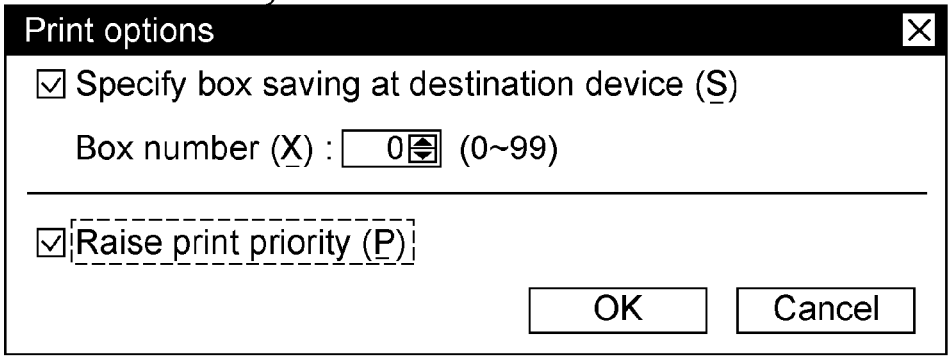

FIGS. 10A and 10B show a print-property specifying screen 1001 and a print-option specifying screen 1002 that are used when sending a print request from the UI unit 301 of the client terminal 102 to the form storage server 101. When a "Print Options" button in the print-property specifying screen 1001 is pressed, the print-option specifying screen 1002 is displayed. Obviously, the print-option specifying screen 1002 may be displayed as a part of the print-property specifying screen 1001. The print properties set in the print-property setting screen 1001 are used to rewrite print properties in step S605. The print properties set in the print-property specifying screen 1001 are reflected on print data in a page-description-language format output from the spooler 307, as shown in FIGS. 4A and 4B. For example, the print properties are used to change specific print properties when re-printing data once stored in the page-description-language format.

The print properties that can be specified in the print-property specifying screen 1001 are ordinary print properties, such as page range, number of copies, double-sided print, and feeding mode. The print properties specified in the print-property specifying screen 1001 are attached to the print job by the form storage unit 304 via the GDI 306 (step S505 shown in FIG. 5). The print properties attached to the print job are reflected on print data generated by the spooler 307.

On the other hand, the print properties that can be specified in the print-option specifying screen 1002, i.e., specification of storing into a printer box, box number, and priority of print job, are specific to the form printing system according to this embodiment. The specification of storing in a box and the box number are reflected by rewriting print data by the print-job controller 309 (step S605 shown in FIG. 6). The priority of print job is considered when the print-job controller 309 schedules sending of print data to the printer 103 (step S607 shown in FIG. 6).

The setting specified via the print-property specifying screen 1001 and the print-option specifying screen 1002 are used to change setting regarding specific items of print-job data stored as form data in the page-description-language format. Usually, setting parameters that can be changed for data stored in the page-description-language format are limited. The print-option specifying screen 1002 includes specific items that can be changed even after print data is converted into the page-description-language format.

Flowchart of Registration of a Printer to the Form System

Figure 11:
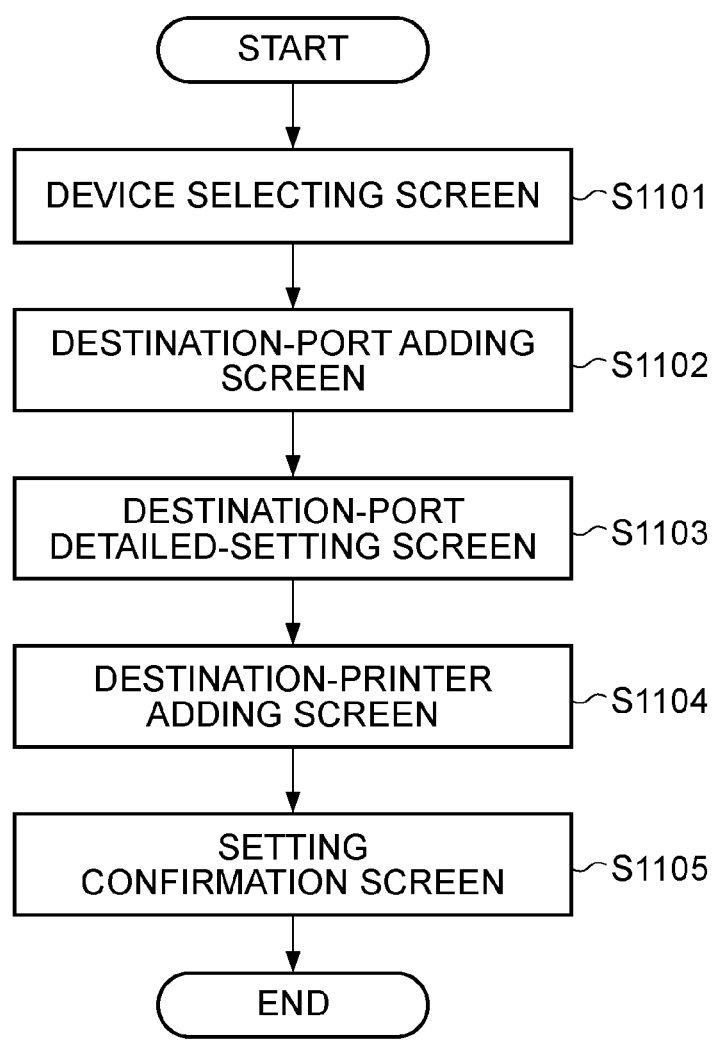
FIG. 11 is a flowchart showing an example of transition of setting screens that are displayed when registering a destination printer in the embodiment.

FIG. 11 is a flowchart of a process that is executed by the client terminal 102 when a destination printer 404 is registered to the form system. Basically, the process corresponds to processing for creating a second printer object 404 associated with the output port 403 of a first printer object 401.

First, the user creates a printer object 401 registered in the Windows® spooler 307. In creating the printer object 401, the user first adds or newly registers a destination port 406 via a screen shown in FIG. 12A.

Figure 12A:
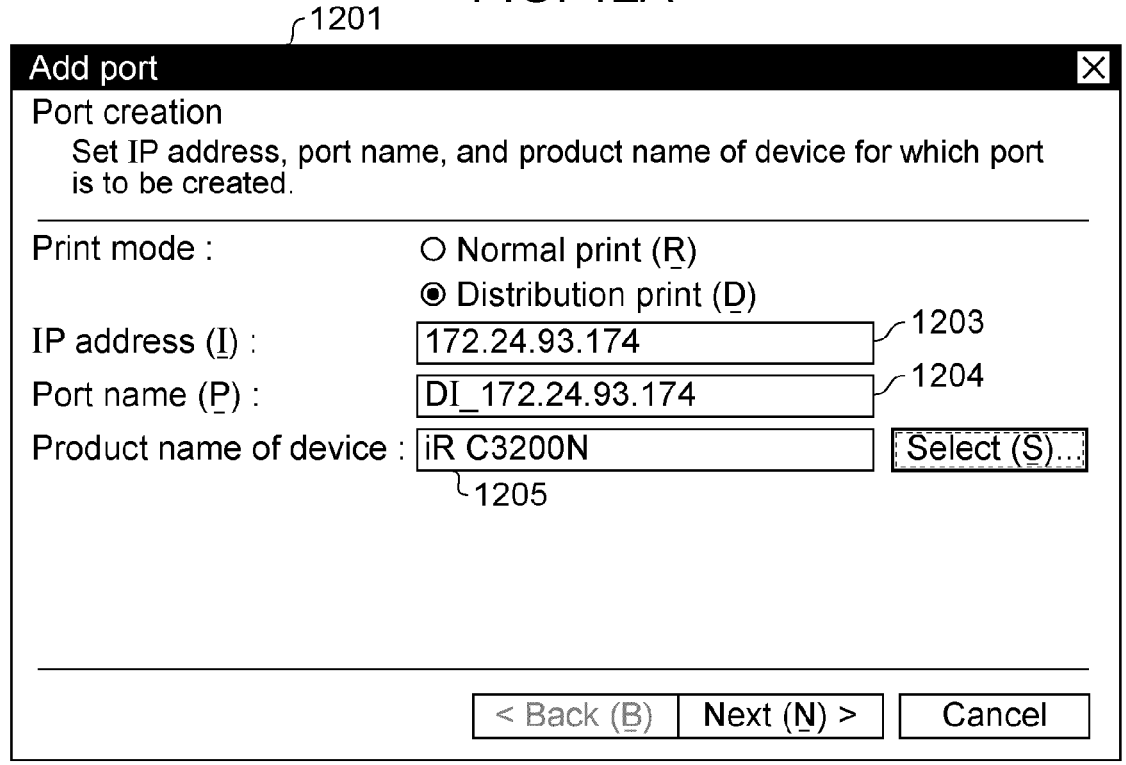
FIGS. 12A and 12B are illustrations showing examples of setting screens for registering a destination printer in the embodiment.

In step S1101, a device selecting screen (not shown) is displayed to prompt the user to select a model (machine type) of the printer 103, and the model selected is displayed in a field 1205 shown in FIG. 12A.

Setting of the added destination port 406 is entered in a destination-port adding screen 1201 (FIG. 12A) displayed in step S1102 and a destination-port-detail setting screen (not shown) displayed in step S1103. The destination-port adding screen 1201 allows setting of the items 702 shown in FIG. 7. Furthermore, the destination-port-detail setting screen allows setting of the items 703 shown in FIG. 7.

In step S1104, a destination-printer adding screen is displayed to allow setting of printer information of the added destination printer 404.

In step S1105, a setting confirmation screen is displayed. The confirmation screen includes setting of both the destination port and the destination printer (the printer object 404). After the setting confirmation screen is displayed in step S1105, when a final instruction is input by the user, addition of the destination port and addition of the destination printer are actually executed.

Setting Screen for Registering a Printer to the Form System

Figure 12B:
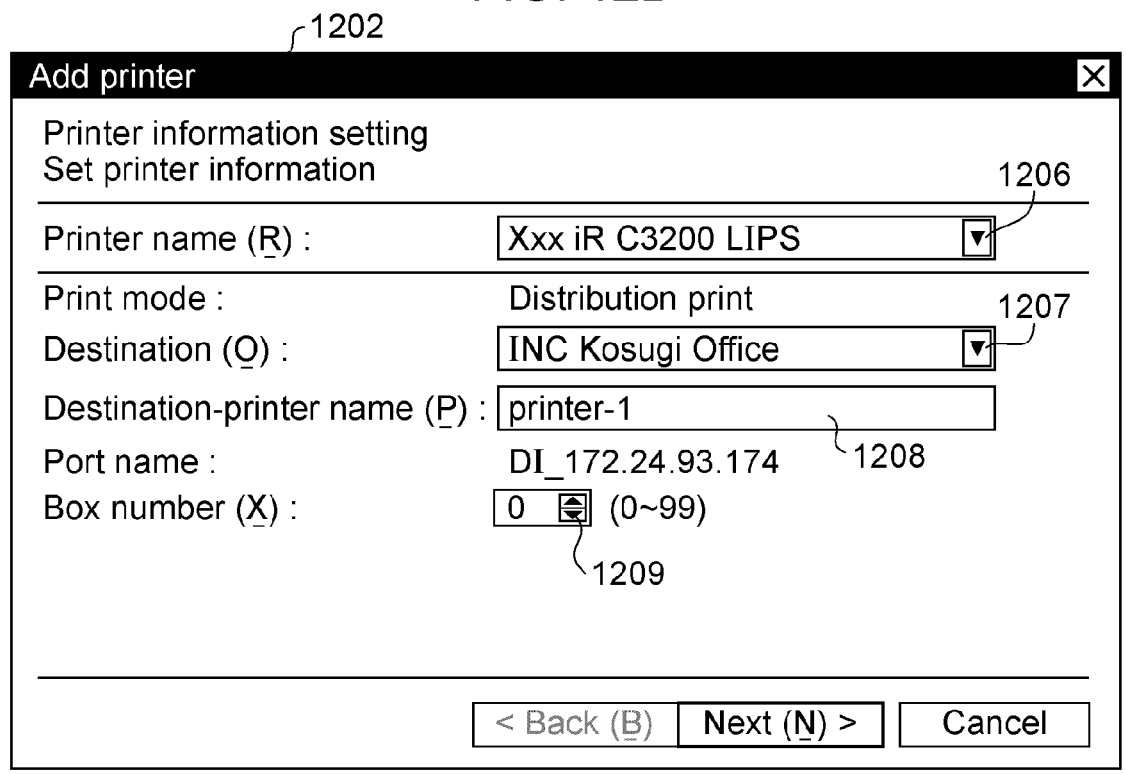

FIG. 12A shows the destination-port adding screen 1201 displayed in the course of screen transition (step S1102 shown in FIG. 11), and FIG. 12B shows the destination-printer adding screen 1202 (step S1104 shown in FIG. 11).

The distribution-port adding screen 1201 shown in FIG. 12A is used to set a distribution port 406 in the print-job controller 309. However, when the output port 403 (the printer object 401) of the Windows® spooler 307 associated with the destination port 406 has not yet been created, the distribution-port adding screen 1201 is used as a setting screen for creating the output port 403. In this embodiment, the destination-printer name input via an input section 1208 in the destination-printer adding screen 1202 shown in FIG. 12B is assigned as a printer name of the spooler 307.

In the destination-port adding screen 1201, the model selected in the device selecting screen (step S1101 shown in FIG. 11) is displayed in a device-product-name field 1205, an IP address of the printer 103 is input to an input field 1203, and a destination-port name is input to a port-name field 1204. The information input in the destination-port adding screen 1201 and information input in the destination-port-detail setting screen (step S1103 shown in FIG. 11) are stored in the destination-port information shown in FIG. 7.

The destination-printer adding screen 1202 shown in FIG. 12B is used to set a destination printer 404 (printer object) managed by the print-job controller 309 shown in FIGS. 4A and 4B. When a "Next" button shown in FIG. 12A is pressed, the destination-printer adding screen 1202 shown in FIG. 12B is displayed. In the destination-printer adding screen 1202, the port name input in the field 1204 shown in FIG. 12 is displayed. Furthermore, a selection list 1206 of Windows® printer objects for generating page-description-language data printable by the printer with the product name 1205 selected in pf 12A is displayed.

In the destination-printer adding screen 1202, a Windows® printer-object name 1206 for inputting a print job is selected, and a destination 1207 ("INC Kosugi Office" in FIG. 12B corresponding to "Site A" in FIG. 9), a destination-printer name 1208, and a default box number 1209 for specification of box printing, are input. The information that has been input is stored in the destination-printer information shown in FIG. 7.

Flowchart of Registering a Printer to the Form System

Figure 13:
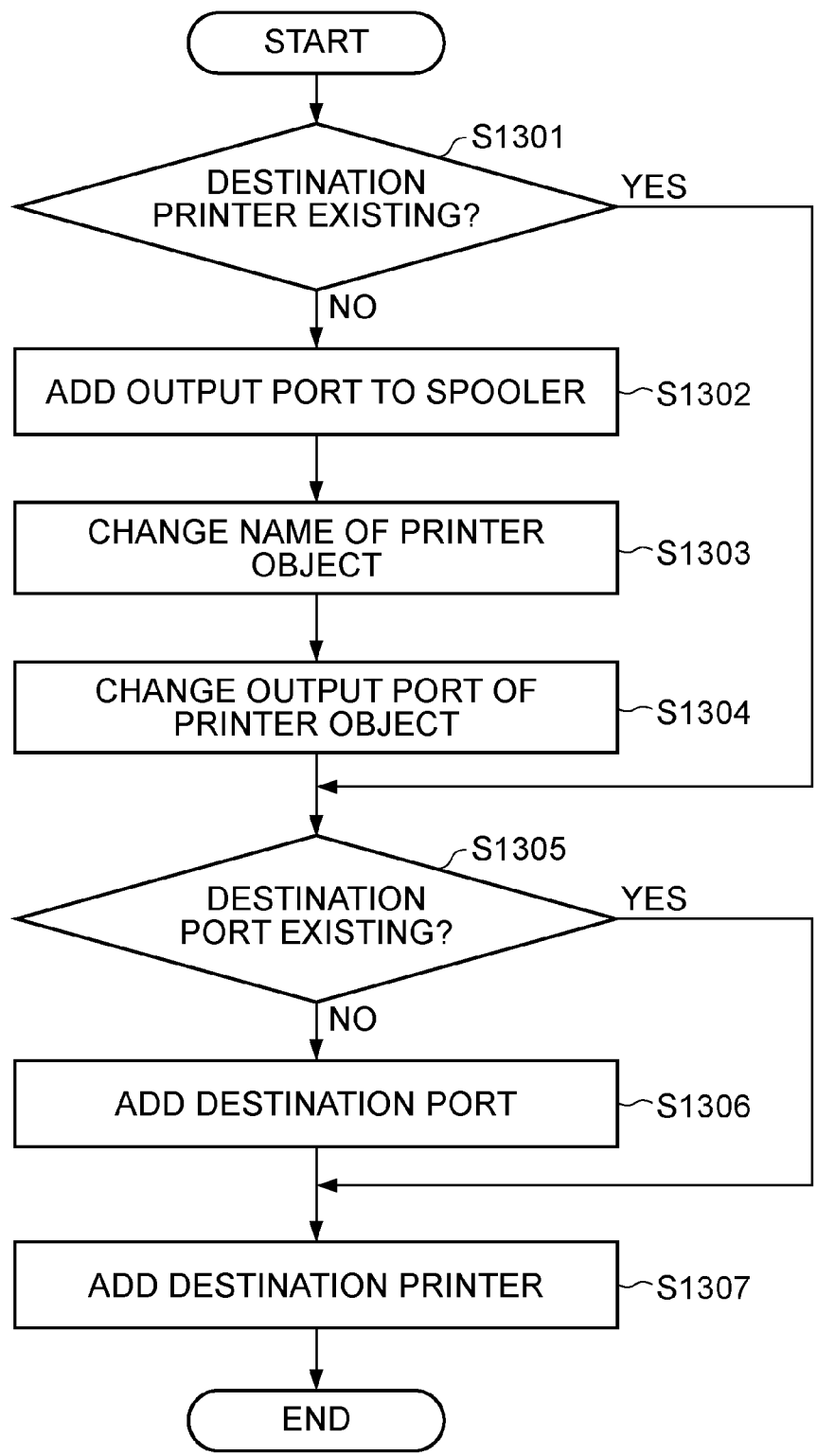
FIG. 13 is a flowchart showing an example of a registration process for registering a destination printer in the embodiment.

FIG. 13 is a flowchart showing a flow of actually adding a destination port and a destination printer on the basis of information input through the process according to the flowchart of screen transition shown in FIG. 11. FIG. 13 corresponds to a process of creating a second printer object 404 associated with the output port 403 of the first printer object 401.

First, in step S1301, it is checked whether a destination printer 404 having the same name as the printer object 401 of the spooler 307 selected in the field 1206 of the destination-printer adding screen 1202 already exists. This checking corresponds to a process of determining whether another second printer object has already been registered in association with the output port 403. More specifically, it is checked whether a destination printer 404 is created for the first time in association with the printer object 401 of the spooler 307 selected in the field 1206. If a destination printer 404 has previously been created before, the printer name of the printer object 401 has already been changed to the same name as the destination printer 404 in step S1303 described later, so that the prior creation of the destination printer 404 can be recognized.

When it is determined in step S1301 that a destination printer 404 with the same name already exists, the process proceeds to step S1305.

On the other hand, when it is determined in step S1301 that a destination printer 404 with the same name does not exist, in steps S1302 to S1304, a destination printer is added for the first time in association with the printer object 401 of the spooler 307 selected in the destination-printer adding screen 1202.

In step S1302, an output port 403 having the same name as the destination-port name input in the destination-port adding screen 1201 is added.

In step S1303, the name of the printer object 401 is changed to the destination-printer name (identifier (name) of the second printer object) input in the destination-printer adding screen 1202.

In step S1304, the output port 403 added to the spooler 307 in step S1302 is set as the output port of the printer object 401 with the name changed in step S1303.

In step S1305, it is checked whether the destination port 406 input in the destination-port adding screen 1201 already exists. When it is determined in step S1305 that the destination port 406 already exists, the process proceeds to step S1307. On the other hand, when step S1305 results in YES, a destination printer is additionally registered under the printer object 401 that has already been created.

When it is determined in step S1305 that the destination port 406 input in the destination-port adding screen 1201 does not exist, in step S1306, the destination port 406 is additionally registered on the basis of the information input in the destination-port adding screen 1201 and the destination-port detailed-setting screen (step S1103 shown in FIG. 11). Furthermore, in step S1307, the destination printer 404 is added on the basis of the information input in the destination-printer adding screen 1202.

When step S1301 results in NO, in steps S1302 and S1306, the output port 403 having the same name and the destination port 406 having the same name are additionally registered to the spooler 307 and the print-job controller 309, respectively. In step S1303, the name of the printer object of the spooler 307 is changed to the name of the destination printer added in step S1307. Thus, the destination printer 404 and the destination port 406 associated with and having the same names as the printer object 401 and the output port 403 of the spooler 307 exist in the print-job controller 309. The destination printer 404 serves as an output destination of a print job input from an ordinary application to the printer object 401. That is, through step S1303, even when a print instruction is issued from an ordinary application and print data is input to the print-job controller 309, the print data can be sent (output) to an output destination specified by the user as shown in FIG. 8B.

The reasons for setting the names of the printer object and the output port 403 of the spooler 307 to be the same as the names of the destination printer 404 and the destination port 406 are as follows. When a print instruction is issued from an ordinary application, it is not possible to recognize the destination printer 404 and the destination port 404 (not displayed on the UI). Thus, using the names of the printer object 401 and the output port 403 of the spooler 307, it is allowed to recognize that printing is executed using the destination printer 404 and the destination port 406 as output destinations.

The output port 403 added in step S1302 has the same name as the destination-port name input in the destination-port adding screen 1201. However, in actual operation, print data is passed to the output-destination determining unit 308.

Flowchart of Deletion of a Destination Printer

Figure 14:
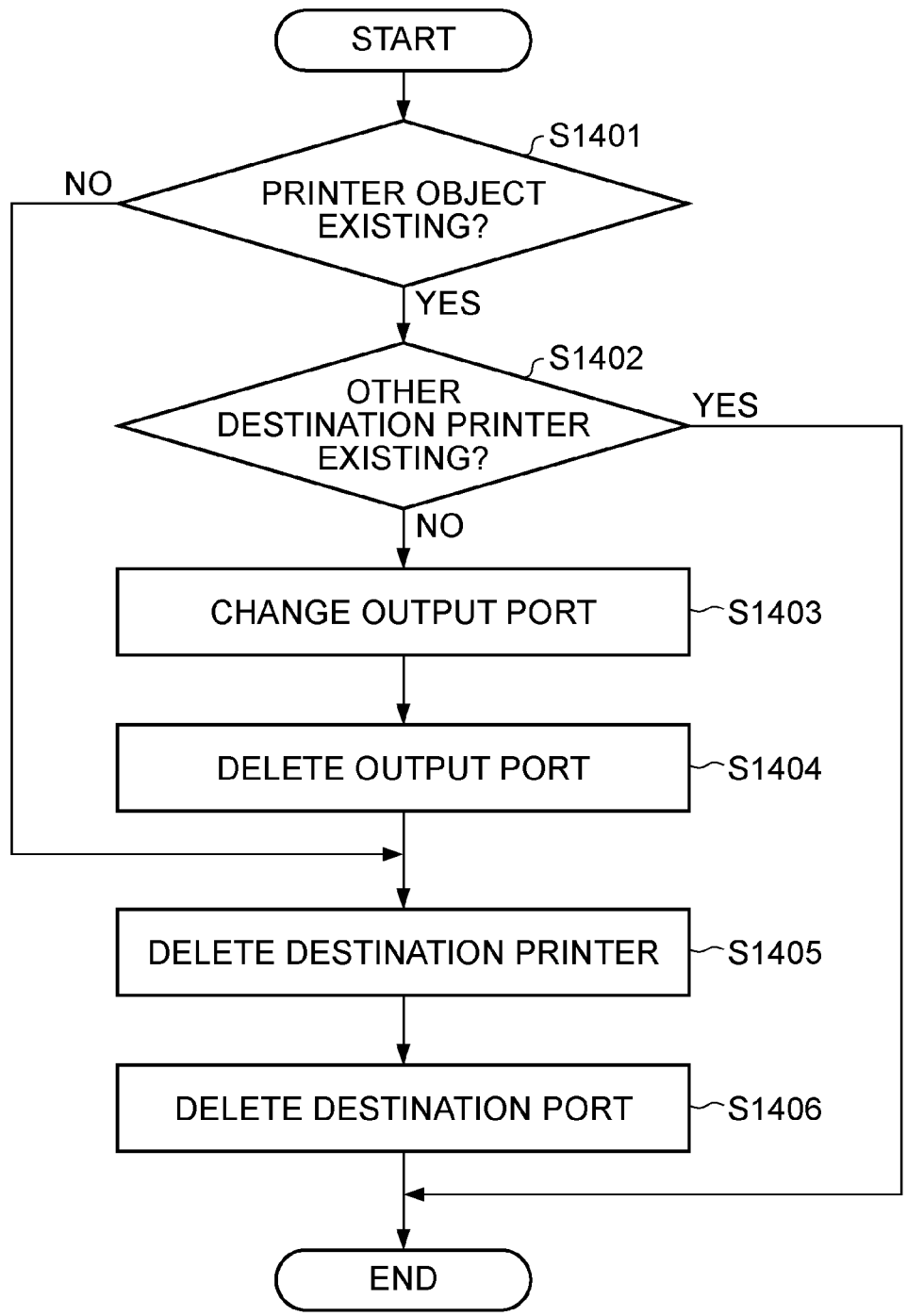
FIG. 14 is a flowchart showing an example of a deletion process for deleting a destination printer in the embodiment.

FIG. 14 is a flowchart showing a flow of deletion of a destination printer 404 from the UI unit 301 of the client terminal 102. In step S1401, it is checked whether a printer object 401 having the same name as a destination printer 404 specified in a deletion request exists. When it is determined in step S1401 that such a printer object 401 does not exist, the process proceeds to step S1405.

On the other hand, when it is determined in step S1401 that a printer object 401 having the same name as the destination printer 401 specified in the deletion request exists, in step S1402, it is checked whether any destination printer 404 other than the destination printer specified in the deletion request exists. When it is determined in step S1402 that such a destination printer 404 exists, the process is exited. In this embodiment, deletion of a destination printer 404 having the same name as the printer object 401 is prohibited when any other destination printer exists. When it is determined in step S1402 that destination printers 404 other than the destination printer specified in the deletion request do not exist, the output port 403 of the printer object 401 of the spooler 307 is changed to a certain output port, such as LPT1. Then, in step S1404, the output port 403 before the change is deleted. In step S1405, the destination printer 404 specified in the deletion request is deleted. Then, in step S1406, the destination port 406 is deleted.

Manner of Holding Data of Authentication Information 315

FIG. 15 is a diagram showing a data structure of authentication information 315 that is referred to in step S502 shown in FIG. 5. Referring to FIG. 15, for each printer identifier representing a second printer object, and for each document identifier, resource information representing permission or prohibition of use is managed in association with user IDs. That is, the authentication information 315 is managed by an authentication-information management unit.

More specifically, the authentication information includes a list of access control information, and the access control information includes a resource type, a resource name, an access type, an authentication type, and a user-ID list.

The resource type indicates a type of a resource managed by the form storage server. In this case, the resource type indicates form data or a destination printer.

The resource name indicates an owner name included in form data. In the case of a destination printer, the resource name indicates a destination-printer name. In the case shown in FIG. 15, the resource type is form data.

The access type indicates the type of access privilege for execution of a request, such as read, write, or execution (exec). The authentication type indicates permission or denial of the access privilege indicated by the access type. The user-ID list is a list of user IDs representing users relevant to access control. In step S502 shown in FIG. 5, a user ID relevant to the request is searched for from access control information of resources relevant to the request, thereby checking whether execution of processing corresponding to the request is allowed.

Second Embodiment

In the first embodiment described above, as shown in FIG. 8, only one printer object is registered in the OS in association with the spooler 307 with the print-job controller 309 as an output destination port. Obviously, however, the present invention is not limited to this case.

For example, when the form printing system manages a plurality of printers 103 of different models (machine types), a number of printer objects 401 corresponding to the number of models (machine types) is created on the spooler 307.

In any case, it is not needed to register printer objects in the spooler 307 more than necessary. Thus, it is possible to implement a printing system in which a plurality of printers can be provided without increasing cost of servers.

Third Embodiment

In the embodiments described above, in step S502, whether to permit or prohibit use of a resource is determined on the basis of a user ID, a destination-printer identifier, and form data included in a print request and on the basis of the resource information shown in FIG. 15. However, the present invention is not limited to this case. For example, it is possible to define permission or prohibition of use only in relation to either a destination-printer identifier or form data. In this case, in the resource information shown in FIG. 15, described in relation to the first embodiment, user IDs are associated with either destination printers (printer identifiers) or form data (document identifiers). That is, a resource that is not restricted in association with user IDs in the resource information is available to any user.

Other Embodiments

The present invention may be applied to a system composed of a plurality of apparatuses, or to an independent apparatus. For example, the present invention can be applied to a printer, a facsimile machine, a personal computer, or a computer system including servers and clients.

The objects of the present invention may also be achieved by providing a program of software implementing the functions of the embodiments described above to a system or an apparatus directly or remotely so that a computer of the system or the apparatus is allowed to read and execute the program code.

Thus, the program code installed on a computer to achieve the processing functions according to the above embodiments is within the scope of the present invention. That is, the computer program for achieving the processing functions falls within the scope of the present invention.

In that case, the program may be object code, a program executed by an interpreter, script data supplied to an operating system, or the like, as long as it functions as a program.

A recording medium for supplying the program may be a floppy disk, a hard disk, an optical disk, a magneto-optical disk, an MO, a CD-ROM, a CD-R, a CD-RW, a magnetic tape, a non-volatile memory card, a ROM, a DVD (DVD-ROM or DVD-R), or the like.

Alternatively, the program may be obtained by accessing a Web page on the Internet using a browser of a client computer and downloading a computer program embodying the present invention or a file including a compressed program and having an automatic installation function from the Web page to a recording medium such as a hard disk. Yet alternatively, program code of a program embodying the present invention may be divided into a plurality of files and the files may be downloaded from different Web pages. That is, a WWW server that allows a plurality of users to download a program file for achieving processing functions by a computer may serve as a feature of the present invention.

Furthermore, a program embodying the present invention may be encrypted and stored on a storage medium such as a CD-ROM for distribution to a user. In that case, a user who satisfies a predetermined condition is allowed to download key information for decryption from a Web page via the Internet, using the key information to execute the encrypted program and install the program on a computer.

Furthermore, instead of a computer reading an executing a program to achieve the functions of the embodiments described above, the functions of the embodiments may be achieved by an operating system or the like running on the computer, executing actual processing in part or in entirety according to the program.

Furthermore, a program read from a recording medium may be written to a memory of a function extending board or a function extending unit connected to the computer so that a CPU or the like of the function extending board or the function extending unit executes actual processing in part or in entirety according to the program, thereby achieving the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-148243 filed May 29, 2006, which is hereby incorporated by reference herein in its entirety.

What is claimed is:

1. An information processing apparatus with an operating system running thereon, the information processing apparatus managing a first printer object which includes a print queue and an output port and which resides in a spooler of the operating system and comprising:
    a print-job controller configured to receive input of print data output from the output port of the first printer object, and to manage a plurality of second printer objects, each of which includes a print queue and an output port and does not reside in the spooler of the operating system,
    wherein the print-job controller includes:
        a recognition unit configured to recognize a printer identifier which is issued in response to a print request by a specified application and which is received not via the spooler of the operating system, the printer identifier specifying one of the plurality of second printer objects;
        a determining unit configured to determine an output destination of the print data output from the output port of the first printer object, the output destination being an output destination associated with the second printer object specified by the printer identifier recognized by the recognition unit; and
        an output unit configured to output the print data to a printing device according to a setting of the second printer object specified by the printer identifier recognized by the recognition unit,
    wherein the output unit outputs, in a case where a print job to which an identifier for identifying a print job is not added and the print job is input to the first printer object from another application different from the specified application, the print data to a printing apparatus corresponding to the second printer object having a same printer name as the specified first printer object, and
    wherein an identifier for identifying a print job is not added to the print job input by the other application to the first printer object.

2. An information processing apparatus according to claim 1, further comprising a job-name setting unit configured to set an identifier to a name of a print job, the identifier indicating that the print data has been from a specific source, wherein the determining unit is configured to output the print data to a printing device at an output destination associated with a second printer object having the same identifier as the specified first printer object when the determining unit fails to detect the identifier.

3. An information processing apparatus according to claim 1, wherein the recognition unit is configured to recognize the printer identifier before the print data is input to the print-job controller via the output port.

4. An information processing apparatus according to claim 1, further comprising:
- a resource manager configured to manage resource information representing setting as to permission or prohibition of use in association with each user ID, regarding a printer identifier or a document identifier for each of the plurality of second printer objects; and
- an authentication unit configured to determine whether to allow execution of the print request on the basis of a user ID, a printer identifier, and a document identifier included in the print request and on the basis of the resource information.

5. An information processing apparatus according to claim 1, further comprising:
- a holding unit configured to hold the print data in a page-description-language format so that an instruction for re-printing the print data is allowed;
- a display controller configured to display on a display unit a setting screen for changing setting regarding a specific item of the print data held in the holding unit; and
- a re-printing unit configured to re-print the print data with the setting made via the setting screen reflected on the print data in the page-description-language format.

6. A print controlling method for an information processing apparatus with an operating system running thereon, the print controlling method comprising:
- an input step of causing a print-job controller to receive print data output from an output port of a first printer object, the first printer object including a print queue and an output port and residing in a spooler of the operating system; and
- a recognition step of causing the print-job controller to recognize a printer identifier which is issued in response to a print request by a specified application and which is received not via the spooler of the operating system, the printer identifier specifying one of a plurality of second printer objects which is not set in the spooler of the operating system and which is managed by the print-job controller, each of the plurality of second printer objects includes a print queue and an output port;
- a determining step of causing the print-job controller to determine an output destination of the print data output from the output port of the first printer object, the output destination being an output destination associated with the second printer object specified by the printer identifier recognized in the first recognition step;
- an output step of causing the print-job controller to output the print data to a printing device according to a setting of the second printer object specified by the printer identifier recognized in the recognition step,
- wherein the output step outputs, in a case where a print job to which an identifier for identifying a print job is not added and the print job is input to the first printer object from another application different from the specified application, the print data to a printing apparatus corresponding to the second printer object having a same printer name as the specified first printer object, and
- wherein an identifier for identifying a print job is not added to the print job input by the other application to the first printer object.

7. A print controlling method according to claim 6, further comprising a job-name setting step of setting an identifier to a name of a print job, the identifier indicating that the print job has been from a specific source, wherein, in the determining step, the print data is output to a printing device at an output destination associated with a second printer object having the same identifier as the specified first printer object when the determining unit fails to detect the identifier.

8. A print controlling method according to claim 6, wherein, in the recognition step, the printer identifier is recognized before the print data is input to the print-job controller via the output port.

9. A print controlling method according to claim 6, further comprising:
- a resource managing step of managing resource information including for each user ID in connection with a printer identifier or a document identifier settings as to permission or prohibition of use for each of the plurality of second printer objects; and
- an authentication step of determining whether to allow execution of the print request on the basis of a user ID, a printer identifier, and a document identifier included in the print request and on the basis of the resource information.

10. A print controlling method according to claim 6, further comprising:
- a holding step of holding the print data in a page-description-language format so that an instruction for re-printing the print data is allowed;
- a display controlling step of displaying on a display unit a setting screen for changing setting regarding a specific item of the print data held in the holding unit; and
- a re-printing step of re-printing the print data with the setting made via the setting screen reflected on the print data in the page-description-language format.

11. A print controlling program stored on a non-transitory computer-readable storage medium, the print controlling program being executed by an information processing apparatus with an operating system running thereon, the print controlling program comprising:
- an input step of causing a print-job controller to receive print data output from an output port of a first printer object, the first printer object including a print queue and an output port and residing in a spooler of the operating system;
- a recognition step of recognizing a printer identifier which is issued in response to a print request by a specified application and which is received not via the spooler of the operating system, the printer identifier specifying one of a plurality of second printer objects which is not set in the spooler of the operating system and which is managed by the print-job controller, each of the plurality of second printer objects includes a print queue and an output port;
- a determining step of determining an output destination of the print data output from the output port of the first printer object, the output destination being an output destination associated with the second printer object specified by the printer identifier recognized in the recognition step; and
- an output step of outputting the print data to a printing device according to a setting of the second printer object specified by the printer identifier recognized in the recognition step,
- wherein the output step outputs, in a case where a print job to which an identifier for identifying a print job is not added and the print job is input to the first printer object from another application different from the specified application, the print data to a printing apparatus corresponding to the second printer object having a same printer name as the specified first printer object, and wherein an identifier for identifying a print job is not added to the print job input by the other application to the first printer object.

12. A non-transitory computer-readable storage medium having stored thereon a print controlling program for causing a computer to execute a print controlling method, the print controlling program comprising:
  an input step of causing a print-job controller to receive print data output from an output port of a first printer object, the first printer object including a print queue and an output port and residing in a spooler of the operating system running on an information processing apparatus;
  a recognition step of recognizing a printer identifier which is issued in response to a print request by a specified application and which is received not via the spooler of the operating system, the printer identifier specifying one of a plurality of second printer objects which is not set in the spooler of the operating system and which is managed by the print-job controller, each of the plurality of second printer objects includes a print queue and an output port;
  a determining step of determining an output destination of the print data output from the output port of the first printer object, the output destination being an output destination associated with the second printer object specified by the printer identifier recognized in the recognition step;
  an output step of outputting the print data to a printing device according to a setting of the second printer object specified by the printer identifier recognized in the recognition step,
  wherein the output step outputs, in a case where a print job to which an identifier for identifying a print job is not added and the print job is input to the first printer object from another application different from the specified application, the print data to a printing apparatus corresponding to the second printer object having a same printer name as the specified first printer object, and
  wherein an identifier for identifying a print job is not added to the print job input by the other application to the first printer object.

* * * * *